United States Patent
Moore et al.

(10) Patent No.: US 11,692,113 B2
(45) Date of Patent: *Jul. 4, 2023

(54) NONAQUEOUS SOL-GEL FOR ADHESION ENHANCEMENT OF WATER-SENSITIVE MATERIALS

(71) Applicant: THE BOEING COMPANY, Chicago, IL (US)

(72) Inventors: James A. Moore, Gilbert, AZ (US); Daniel W. Huff, Scottsdale, AZ (US); Dennis K. Kennedy, Mesa, AZ (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,331

(22) Filed: Sep. 6, 2022

(65) Prior Publication Data

US 2023/0033110 A1 Feb. 2, 2023

Related U.S. Application Data

(63) Continuation of application No. 15/837,058, filed on Dec. 11, 2017, now Pat. No. 11,505,722.

(Continued)

(51) Int. Cl.
*C09D 5/08* (2006.01)
*C09D 185/00* (2006.01)
(Continued)

(52) U.S. Cl.
CPC .............. *C09J 9/00* (2013.01); *B01J 13/003* (2013.01); *B01J 13/0065* (2013.01); *C09D 1/00* (2013.01);
(Continued)

(58) Field of Classification Search
CPC ........ C09J 9/00; C09J 11/06; C09J 2400/163; C09J 2400/166; C09J 5/02; B01J 13/003;
(Continued)

(56) References Cited

U.S. PATENT DOCUMENTS 4,532,185 A 7/1985 Balchunis et al.
5,814,137 A 9/1998 Blohowiak et al.
(Continued)

FOREIGN PATENT DOCUMENTS

CN 1425049 A 6/2003
CN 101184866 A 5/2008
(Continued)

OTHER PUBLICATIONS

Schmidt et al., "Chemistry And Applications of Inorganic-Organic Polymers (Organically Modified Silicates", MRS Online Proceeding Library, 73, 739-750 (1986) (Year: 1986).*

(Continued)

*Primary Examiner* — Thanh Truc Trinh
(74) *Attorney, Agent, or Firm* — Patterson + Sheridan, LLP

(57) ABSTRACT

The present disclosure provides methods for forming sol-gels, sol-gel films and substrates, such as vehicle components, having a sol-gel film disposed thereon. At least one method of forming a sol-gel includes mixing a metal alkoxide, an acid stabilizer, and an organic solvent to form a first mixture having about 10 wt % or less water content based on the total weight of the first mixture. The method includes mixing an organosilane with the first mixture to form a second mixture having about 10 wt % or less water content based on the total weight of the second mixture.

20 Claims, 5 Drawing Sheets

Related U.S. Application Data

(60) Provisional application No. 62/527,387, filed on Jun. 30, 2017.

(51) Int. Cl.

| | |
|---|---|
| *B64D 45/00* | (2006.01) |
| *C09D 5/00* | (2006.01) |
| *C23C 18/12* | (2006.01) |
| *C09J 9/00* | (2006.01) |
| *C09J 11/06* | (2006.01) |
| *B01J 13/00* | (2006.01) |
| *C09J 5/02* | (2006.01) |
| *C09D 1/00* | (2006.01) |
| *C23C 22/73* | (2006.01) |

(52) U.S. Cl.
CPC ............... *C09D 5/08* (2013.01); *C09J 5/02* (2013.01); *C09J 11/06* (2013.01); *C23C 18/122* (2013.01); *C23C 18/1216* (2013.01); *C23C 18/1241* (2013.01); *C23C 18/1254* (2013.01); *C23C 22/73* (2013.01); *C09J 2400/163* (2013.01); *C09J 2400/166* (2013.01)

(58) Field of Classification Search
CPC .......... B01J 13/0065; C09D 1/00; C09D 5/08; C23C 18/1216; C23C 18/122; C23C 18/1241; C23C 18/1254; C23C 22/73
See application file for complete search history.

(56) References Cited

U.S. PATENT DOCUMENTS

| | | | |
|---|---|---|---|
| 5,849,110 A | 12/1998 | Blohowiak et al. | |
| 5,939,197 A | 8/1999 | Blohowiak et al. | |
| 6,183,908 B1 | 2/2001 | Miyasaka et al. | |
| 6,316,092 B1 | 11/2001 | Frank et al. | |
| 7,662,241 B2 | 2/2010 | Sinko | |
| 10,508,205 B2 * | 12/2019 | Schuette | C09D 5/08 |
| 10,926,237 B2 * | 2/2021 | Schuette | C09D 5/084 |
| 2001/0056141 A1 | 12/2001 | Schutt | |
| 2003/0024432 A1 | 2/2003 | Chung et al. | |
| 2004/0099183 A1 | 5/2004 | Wire et al. | |
| 2007/0148461 A1 | 6/2007 | Ippoliti et al. | |
| 2009/0136859 A1 | 5/2009 | Molaire et al. | |
| 2009/0148711 A1 | 6/2009 | Le Blanc et al. | |
| 2013/0184142 A1 | 7/2013 | Schmidt | |
| 2015/0337171 A1 * | 11/2015 | Melzer | C09D 183/06 156/278 |
| 2016/0145443 A1 | 5/2016 | Kinlen et al. | |
| 2016/0273111 A1 | 9/2016 | Morris | |
| 2019/0002740 A1 | 1/2019 | Moore et al. | |

FOREIGN PATENT DOCUMENTS

| | | |
|---|---|---|
| CN | 101331198 A | 12/2008 |
| CN | 105143511 A | 12/2015 |
| CN | 105419631 A | 3/2016 |
| CN | 105624659 A | 6/2016 |
| CN | 106731886 A | 5/2017 |
| EP | 3272903 A1 | 1/2018 |
| EP | 3351599 A1 | 7/2018 |
| EP | 3421563 A1 | 1/2019 |
| JP | H11090327 A | 4/1999 |
| JP | 2001177236 A | 6/2001 |
| JP | 2003512921 A | 4/2003 |
| JP | 2004521988 A | 7/2004 |
| JP | 2008542179 A | 11/2008 |
| JP | 2009521565 A | 6/2009 |
| JP | 2011505024 A | 2/2011 |
| JP | 2012509982 A | 4/2012 |
| JP | 2016121331 A | 7/2016 |
| JP | 2016521294 A | 7/2016 |
| JP | 2016524629 A | 8/2016 |
| RU | 2407705 C1 | 12/2010 |
| WO | 2014151533 A1 | 9/2014 |
| WO | 2014176006 A1 | 10/2014 |
| WO | 2015141576 A1 | 9/2015 |

OTHER PUBLICATIONS

European Patent Office, Communication Pursuant to Article 94(3) EPC for Application 18 180 739.7-1102 dated Dec. 9, 2022.
Notice of Reasons for Rejection for Application 2018-120786 dated Jan. 4, 2022.
Innovation, Science and Economic Development Canada Office Action for Application 3,007,167 dated Jan. 19, 2022.
The State Intellectual Property Office of The People's Republic of China, Decision of Rejection for Application 2018107147005 dated Jan. 27, 2022.
Qiu Jiawen et al., "Thermal Control Film Technology for Spacecraft," National Defense Industry Press, Jun. 2016, pp. 174-175.
Innovation, Science and Economic Development Canadian Requisition by Examiner for Application No. 3007167 dated May 26, 2021.
Jianfeng Huang, "Sol-gel Principle and Technology," Chemical Industry Press, Publication Date: Sep. 30, 2005, pp. 1-2.
Chinese National Intellectual Property Administration, Notification of The Second Office Action for Application 2018107147005 dated Sep. 8, 2021.
Innovation, Science and Economic Development Canadian Requisition by Examiner for Application No. 3007126 dated Jun. 14, 2021 (dated Jun. 14, 2021).
Translation of JP 2001-177236, 2001, pp. 1-10 (Year: 2001).
European Patent Office Communication Pursuant to Article 94(3) EPC for Application No. 18180742.1-1102 dated Apr. 30, 2021.
European Patent Office Communication Pursuant to Article 94(3) EPC for Application No. 18180739.7-1102 dated Apr. 30, 2021.
Chinese Office Action for Application No. 201810714 700.5 dated Feb. 25, 2021.
Chinese Office Action for Application No. 201810713200.X dated Feb. 24, 2021.
Extended European Search Report for Application No. 18180742. 1-1102 dated Nov. 29, 2018.
Molina et al, "Organic-Inorganic Hybrids Prepared by Carboxylic Acid Solvolysis: Planar Waveguides," Optical Materials 34, 2012, p. 910-914.
European Search Report for Application No. EP18180739 dated Nov. 30, 2018.
CAS Registry No. 71-41-0 Scifinder ACS 2019.
Qi_Journal of Applied Physics 100_083102 (2006).
Hoebbel article JI of Sol-Gel Science and Technology 21-177-187 (2001).
Japanese Patent Office, Notice of Reasons for Rejection for Application 2018-120808 dated Jan. 17, 2023.

* cited by examiner

NONAQUEOUS SOL-GEL FOR ADHESION ENHANCEMENT OF WATER-SENSITIVE MATERIALS

CROSS-REFERENCE TO RELATED APPLICATIONS

This application is a continuation application of U.S. Non-provisional patent application Ser. No. 15/837,058, filed on Dec. 11, 2017, which claims the benefit of co-pending U.S. Provisional Patent Application Ser. No. 62/527,387, filed on Jun. 30, 2017. The aforementioned related patent applications are incorporated herein by reference in their entireties.

GOVERNMENT SUPPORT

This invention was made with Government support under W911W6-07-D-0002 awarded by the Department of Defense. The government has certain rights in this invention.

FIELD

The present disclosure provides methods for forming sol-gels, sol-gel films and substrates, such as vehicle components, having a sol-gel film disposed thereon.

BACKGROUND

Aircraft surfaces are typically made of a metal, such as aluminum or titanium. A primer can be coated on the metal surface to prevent or reduce corrosion. To further improve the adhesion of primers to the metal surfaces, adhesive coatings are typically disposed between a metal surface and a primer.

An adhesive sol-gel film can be disposed at the interface between the metal and primer. Adhesive sol-gel films typically contain greater than 90 wt % water and, often times, greater than 95 wt % water. Water as a solvent for sol-gels is environmentally benign, reduces the amount of waste generated, and has an ability to hydrolyze silanes present in a sol-gel. These sol-gels are effective for corrosion resistance of metals such as titanium or nickel, but other materials, such as low-alloy steels, are not as resistant to corrosion in the presence of water-based sol-gels. Furthermore, a sol-gel can be applied near (and not necessarily onto) a water-sensitive material or component, or in an interior crevice or pocket region, where water exposure or water entrapment might be prevalent.

Therefore, there is a need in the art for new and improved adhesive sol-gels suitable for use with steel substrates.

SUMMARY

The present disclosure provides methods for forming sol-gels, sol-gel films and substrates, such as vehicle components, having a sol-gel film disposed thereon. At least one method of forming a sol-gel includes mixing a metal alkoxide, an acid stabilizer, and an organic solvent to form a first mixture having about 10 wt % or less water content based on the total weight of the first mixture. The method includes mixing an organosilane with the first mixture to form a second mixture having about 10 wt % or less water content based on the total weight of the second mixture.

At least one method of forming a sol-gel includes mixing a metal alkoxide, an acid stabilizer, and an organic solvent to form a first mixture having about 10 wt % or less water content based on the total weight of the first mixture. The method includes mixing an organosilane with the first mixture to form a second mixture having about 10 wt % or less water content based on the total weight of the second mixture. The method includes depositing the first mixture or the second mixture onto a metal substrate. The metal substrate can be a steel substrate. The metal substrate can be a vehicle component that is one or more of a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, and a wing rib-to-skin joint.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
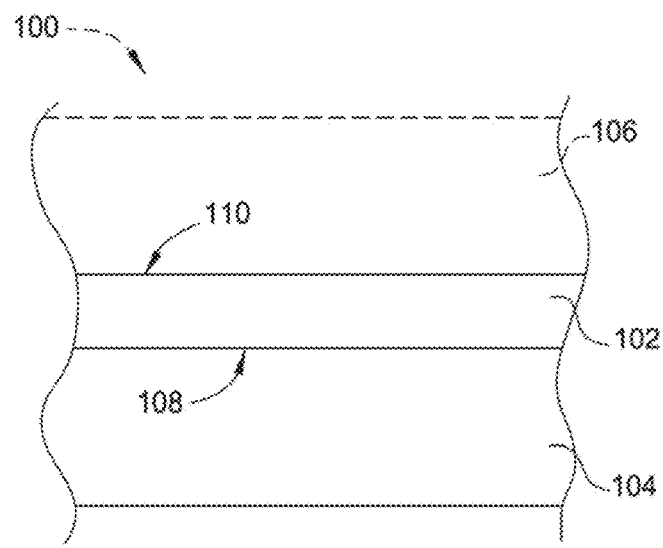
FIG. 1 is a side view of a corrosion-inhibiting sol-gel disposed on a substrate, according to at least one aspect of the present disclosure.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

The present disclosure provides methods for forming sol-gels, sol-gel films and substrates, such as vehicle components, having a sol-gel film disposed thereon. At least one method of forming a sol-gel includes mixing a metal alkoxide, an acid stabilizer, and an organic solvent to form a first mixture having about 10 wt % or less water content based on the total weight of the first mixture. The method includes mixing an organosilane with the first mixture to form a second mixture having about 10 wt % or less water content based on the total weight of the second mixture.

At least one method of forming a sol-gel on a substrate includes depositing the first mixture or the second mixture onto a substrate. The substrates can be a metal substrate. The metal substrate can be a steel substrate. The metal substrate can be a vehicle component that is one or more of a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, and a wing rib-to-skin joint.

Methods for forming sol-gels of the present disclosure can provide improved corrosion resistance of substrates, such as vehicle components, having sol-gels of the present disclosure disposed thereon. For example, a steel vehicle component having a sol-gel having 10 wt % or less water content disposed thereon has improved floating roller peel resistance characteristics (ASTM D3167) as compared to a steel vehicle component having no sol-gel formulation disposed thereon.

Sol-Gels

The term "sol-gel," a contraction of solution-gelation, refers to a reaction product of a series of reactions wherein a soluble metal species (typically a metal alkoxide or metal salt) hydrolyze to form a metal hydroxide. The metal hydroxide can then form heterometal bonds e.g. Si—O—Zr. In the absence of an organic acid, when metal alkoxide is added to water, a white precipitate of, for example, $Zr(OH)_2$, rapidly forms. $Zr(OH)_2$ is not soluble in water, which hinders sol-gel formation. The acid is added to the metal alkoxide to allow a water-based system. The ratio of organics to inorganics in the polymer matrix is controlled to maximize performance of the sol-gel, such as adhesion capability, for a particular application.

Organosilane: In at least one aspect, a weight fraction (wt %) of organosilane in the sol-gel is from about 0.1 wt % to about 20 wt %, such as from about 0.3 wt % to about 15 wt %, such as from about 0.5 wt % to about 10 wt %, such as from about 0.7 wt % to about 5 wt %, such as from about 1 wt % to about 2 wt %, for example about 1 wt %, about 1.5 wt %, about 2 wt %.

In at least one aspect, organosilanes of the present disclosure are represented by formula (I):

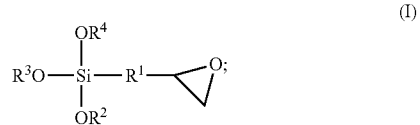

wherein:
each of $R^2$, $R^3$, and $R^4$ is independently linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl;

$R^1$ is selected from alkyl, cycloalkyl, ether, and aryl. Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether.

In at least one aspect, ether is selected from:

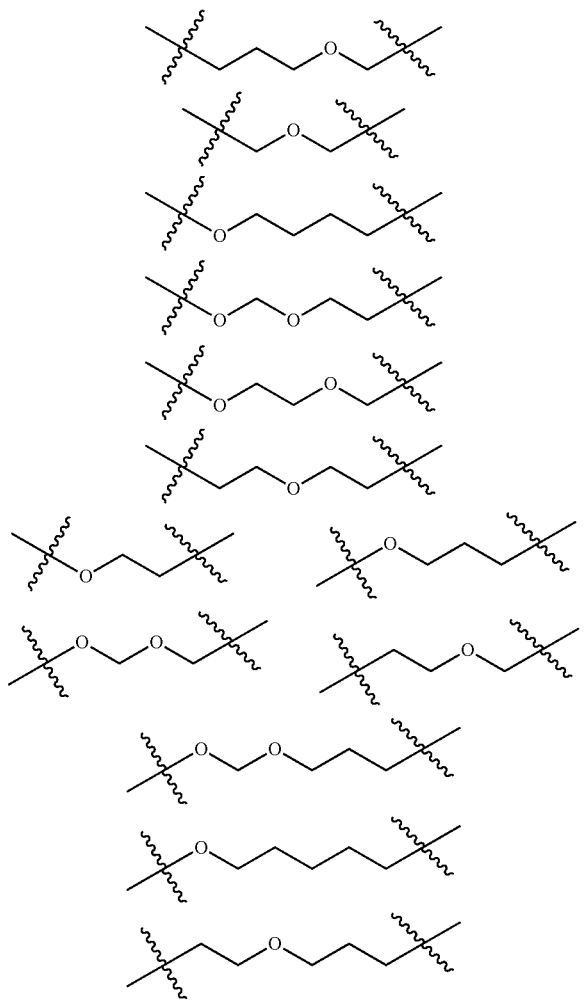

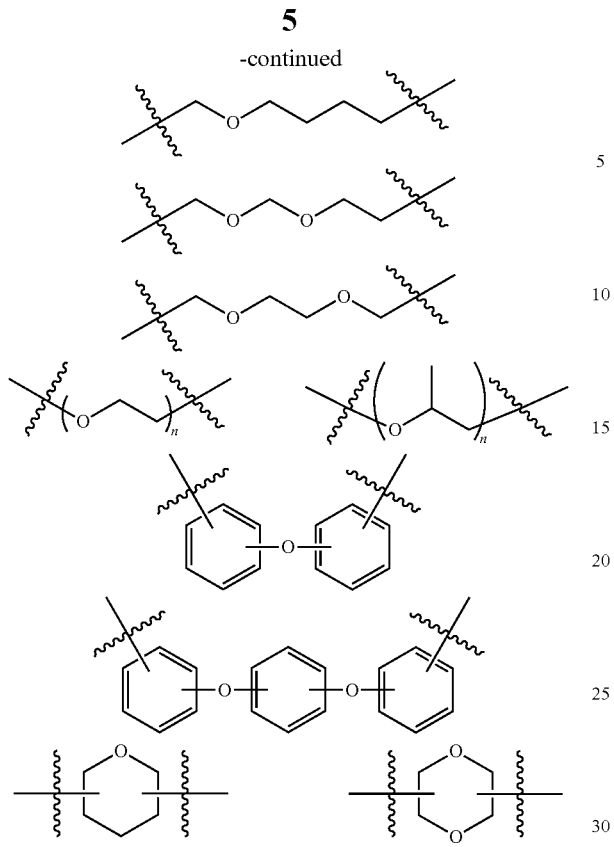

wherein n is a positive integer. In at least one aspect, n is a positive integer and the number average molecular weight (Mn) of the ether is from about 300 to about 500, such as from about 375 to about 450, such as from about 400 to about 425.

In at least one aspect, an organosilane is a hydroxy organosilane. Hydroxy organosilanes are substantially unreactive toward nucleophiles, e.g., some corrosion inhibitors. In at least one aspect, hydroxy organosilanes of the present disclosure are represented by formula (II):

$$\begin{array}{c} \text{OH} \quad\quad \text{OH} \\ | \quad\quad\quad | \\ \text{HO—Si—R—} \\ | \\ \text{OH} \end{array} \text{OH;} \qquad (II)$$

wherein R is selected from alkyl, cycloalkyl, ether, and aryl. Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether.

In at least one aspect, ether is selected from:

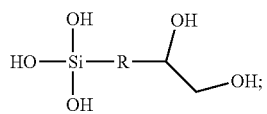

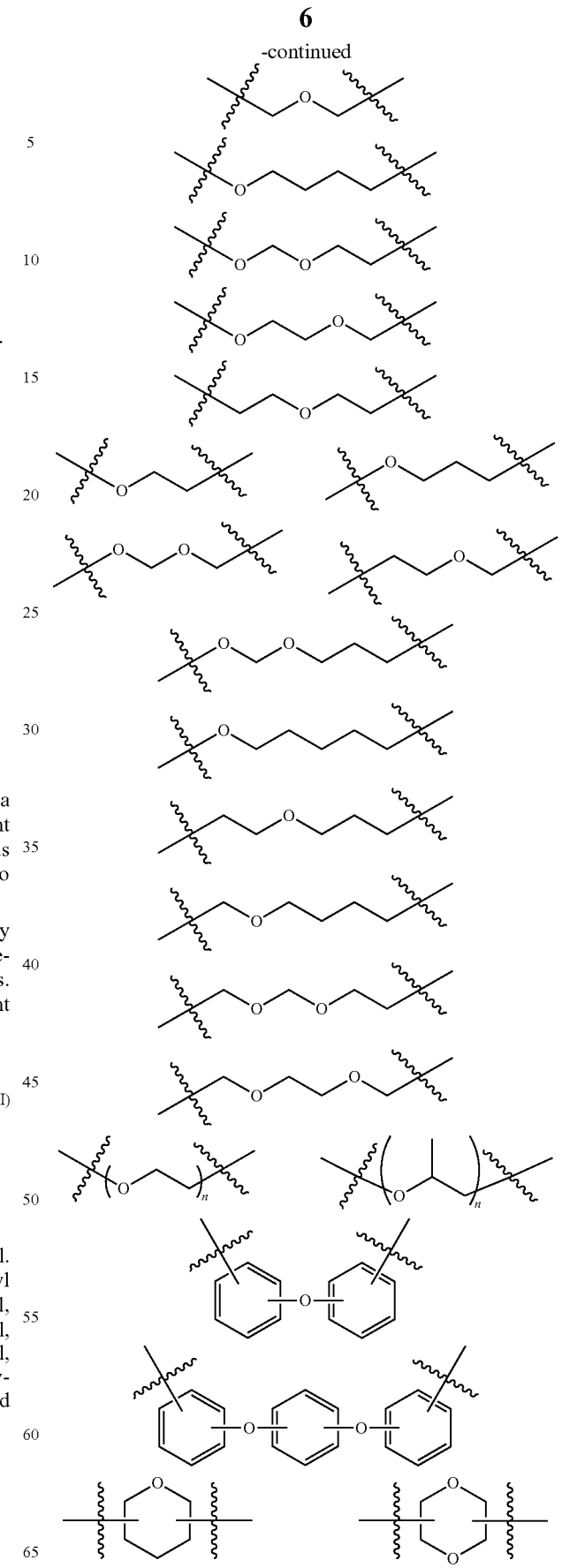

wherein n is a positive integer. In at least one aspect, n is a positive integer and the number average molecular weight (Mn) of the ether is from about 300 to about 500, such as from about 375 to about 450, such as from about 400 to about 425.

In at least one aspect, the organosilane is represented by compound 1 or compound 2:

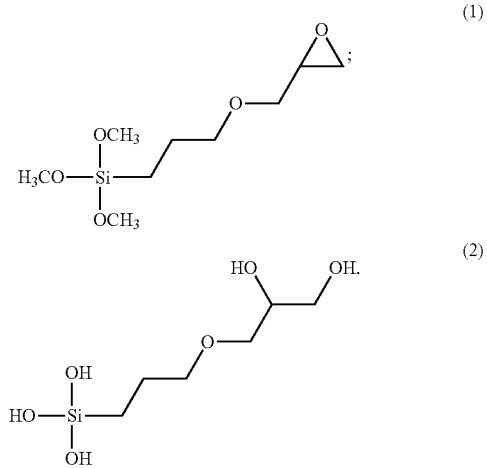

In at least one aspect, an organosilane is selected from 3-aminopropyltriethoxysilane, 3-glycidoxy-propyltriethoxysilane, p-aminophenyltrimethoxysilane, p-aminophenyltriethoxysilane, allyltrimethoxysilane, allyltriethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 2-(3,4-epoxycyclohexyl)ethyltrimethoxysilane, 2-(3,4-epoxycyclohexyl)ethyltriethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane, bis(trimethoxysilyl)ethane, bis(triethoxysilyl)ethane, bis[3-(trimethoxysilyl)propyl]amine, bis[3-(triethoxysilyl)propyl]amine, bis[3-(triethoxysilyl)propyl] disulfide, bis[3-(trimethoxysilyl)propyl] disulfide, bis[3-(triethoxysilyl)propyl] trisulfide, bis[3-(trimethoxysilyl)propyl] trisulfide, bis[3-(triethoxysilyl)propyl] tetrasulfide, and bis[3-(trimethoxysilyl)propyl] tetrasulfide.

In at least one aspect, an organosilane useful to form sol-gels of the present disclosure provides an electrophilic silicon and/or epoxide moiety that can react with a nucleophile, such as a hydroxy-containing nucleophile. In at least one aspect, an organosilane of the present disclosure provides a sol-gel having reduced porosity and blistering as compared to conventional sol-gels.

Metal alkoxide: A metal alkoxide useful to form sol-gels of the present disclosure provides metal atoms coordinated in a sol-gel for adhesive and mechanical strength. Metal alkoxides of the present disclosure include at least one of zirconium alkoxides, titanium alkoxides, hafnium alkoxides, yttrium alkoxides, cerium alkoxides, and lanthanum alkoxides. Metal alkoxides can have four alkoxy ligands coordinated to a metal that has an oxidation number of +4. Non-limiting examples of metal alkoxides are zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide.

In at least one aspect, a weight fraction (wt %) of metal alkoxide in the sol-gel is from about 0.1 wt % to about 10 wt %, such as from about 0.2 wt % to about 5 wt %, such as from about 0.3 wt % to about 3 wt %, such as from about 0.4 wt % to about 2 wt %, such as from about 0.5 wt % to about 1 wt %, for example about 0.2 wt %, about 0.5 wt %, about 1 wt %.

Corrosion inhibitor: A corrosion inhibitor useful to form sol-gels of the present disclosure provides corrosion resistance (to water) of a metal substrate disposed adjacent the sol-gel. Corrosion inhibitors of the present disclosure are compounds having one or more thiol moieties. Metal aircraft surfaces can comprise steel or can be an alloy having a major component, such as aluminum, and a minor component, known as an intermetallic. Intermetallics, for example, often contain copper metal which is prone to corrosion. Without being bound by theory, it is believed that the interaction of thiol moieties of a corrosion inhibitor of the present disclosure with copper-containing intermetallics on a metal surface (such as an aluminum alloy surface) prevents corrosion of the metal surface. More specifically, interaction of the thiol moieties of a corrosion inhibitor of the present disclosure with the intermetallics blocks reduction of the intermetallics by slowing the rate of oxygen reduction and decreasing oxidation of a metal alloy, such as an aluminum alloy.

In at least one aspect, a corrosion inhibitor of the present disclosure is an organic compound that includes a disulfide group and/or a thiolate group (e.g., a metal-sulfide bond). In at least one aspect, a corrosion inhibitor is represented by the formula: $R^1-S_n-X-R^2$, wherein $R^1$ is an organic group, n is an integer greater than or equal to 1, X is a sulfur or a metal atom, and $R^2$ is an organic group. One or both of $R^1$ and $R^2$ can include additional polysulfide groups and/or thiol groups. Furthermore, in at least one aspect, corrosion inhibitors include polymers having the formula $-(R^1-S_n-X-R^2)_q-$, wherein $R^1$ is an organic group, n is a positive integer, X is a sulfur or a metal atom, $R^2$ is an organic group, and q is a positive integer. In at least one aspect, $R^1$ and $R^2$ (of a polymeric or monomeric corrosion inhibitor) is independently selected from H, alkyl, cycloalkyl, aryl, thiol, polysulfide, or thione. Each of $R^1$ and $R^2$ can be independently substituted with a moiety selected from alkyl, amino, phosphorous-containing, ether, alkoxy, hydroxy, sulfur-containing, selenium, or tellurium. In at least one aspect, each of $R^1$ and $R^2$ has 1-24 carbon atoms and/or non-hydrogen atoms. For example, heterocyclic examples of $R^1$ and $R^2$ groups include an azole, a triazole, a thiazole, a dithiazole, and/or a thiadiazole.

In at least one aspect, a corrosion inhibitor includes a metal in a metal-thiolate complex. Corrosion inhibitors can include a metal center and one or more thiol groups (ligands) bonded and/or coordinated with the metal center with a metal-sulfide bond. A thiolate is a derivative of a thiol in which a metal atom replaces the hydrogen bonded to sulfur. Thiolates have the general formula $M-S-R^1$, wherein M is a metal and $R^1$ is an organic group. $R^1$ can include a disulfide group. Metal-thiolate complexes have the general formula M-(S—R$^1$)$_n$, wherein n generally is an integer from 2 to 9 and M is a metal atom. Metals are copper, zinc, zirconium, aluminum, iron, cadmium, lead, mercury, silver, platinum, palladium, gold, and/or cobalt.

In at least one aspect, the corrosion inhibitor includes an azole compound. Examples of suitable azole compounds include cyclic compounds having, 1 nitrogen atom, such as pyrroles, 2 or more nitrogen atoms, such as pyrazoles, imidazoles, triazoles, tetrazoles and pentazoles, 1 nitrogen atom and 1 oxygen atom, such as oxazoles and isoxazoles, and 1 nitrogen atom and 1 sulfur atom, such as thiazoles and isothiazoles. Nonlimiting examples of suitable azole compounds include 2,5-dimercapto-1,3,4-thiadiazole, 1H-benzotriazole, 1H-1,2,3-triazole, 2-amino-5-mercapto-1,3,4-thiadiazole, also named 5-amino-1,3,4-thiadiazole-2-thiol, 2-amino-1,3,4-thiadiazole. In at least one aspect, for example, the azole may be 2,5-dimercapto-1,3,4-thiadiazole. In at least one aspect, the azole may be present in the composition at a concentration of 0.01 g/L of sol-gel composition to 1 g/L of sol-gel composition, for example, 0.4 g/L of sol-gel composition. In some embodiments, the azole compound includes benzotriazole and/or 2,5-dimercapto-1,3,4-thiadiazole.

Corrosion inhibitors of the present disclosure include heterocyclic thiol and amines, which can provide elimination of oxygen reduction. Heterocyclic thiols include thiadiazoles having one or more thiol moieties. Non-limiting examples of thiadiazoles having one or more thiol moieties include 1,3,4-thiadiazole-2,5-dithiol and thiadiazoles represented by formula (III) or formula (IV):

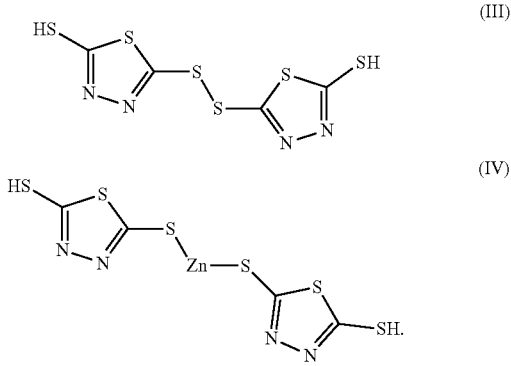

The thiadazole of formula (III) may be purchased from Vanderbilt Chemicals, LLC (of Norwalk, Conn.) and is known as Vanlube® 829. The thiadiazole of formula (IV) may be purchased from WPC Technologies, Inc.™ (of Oak Creek, Wis.) and is known as InhibiCor™ 1000.

A corrosion inhibitor of the present disclosure can be a derivative of 2,5-dimercapto-1,3,4 thiadiazole symbolized by HS—CN$_2$SC—SH or "DMTD", and of selected derivatives of trithiocyanuric acid ("TMT") used for application as a corrosion inhibitor in connection with a paint. Examples include 2,5-dimercapto-1,3,4 thiadiazole (DMTD), and 2,4-dimercapto-s-triazolo-[4,3-b]-1,3-4-thiadiazole, and trithiocyanuric acid (TMT). Other examples include N-, S- and N,N-, S,S- and N,S-substituted derivatives of DMTD such as 5-mercapto-3-phenyl-1,3,4-thiadiazoline-2-thione or bismuthiol II (3-Phenyl-1,3,4-thiadiazolidine-2,5-dithione) and various S-substituted derivatives of trithiocyanuric acid. Other examples include 5,5' dithio-bis (1,3,4 thiadiazole-2 (3H)-thione or (DMTD)$_2$, or (DMTD), the polymer of DMTD; 5,5' thio-bis (1,3,4 thiadiazole-2(3H)-thione; or (TMT)$_2$, the dimer and polymers of TMT. Other examples include salts of DMTD of the general formula: M(DMTD)$_n$, where n=1, 2 or 3, and M is a metal cation such as M=Zn(II), Bi(III), Co(II), Ni(II), Cd(II), Pb(II), Ag(I), Sb(III), Sn(II), Fe(II), or Cu(II) (examples: ZnDMTD, Zn(DMTD)$_2$, Bi(DMTD)$_3$); similar salts of TMT, as for example, ZnTMT, in a ratio of 1:1; and, also, the comparable soluble Li(I), Ca(II), Sr(II), Mg(II), La(III), Ce(III), Pr(III), or Zr(IV) salts. Additional examples include salts of (DMTD)$_n$, of general formula M[(DMTD)$_n$]$_m$, where n=2 or n>2, m=1, 2, or 3 and M is a metal cation such as M=Zn(II), Bi(III), Co(II), Ni(II), Cd(II), Pb(II), Ag(I), Sb(III), Sn(II), Fe(II), or Cu(II). Typical examples are: Zn[(DMTD)$_2$], Zn[(DMTD)$_2$]$_2$.

Additional examples include ammonium-, aryl-, or alkyl-ammonium salts of DMTD, (DMTD)$_n$, or 5,5' thio-bis (1,3,4 thiadiazole-2(3H)-thione or 2,4-dimercapto-s-triazolo-[4,3-b]-1,3-4-thiadiazole. Typical examples include: Cyclohexyl amine: DMTD, in ratios of 1:1 and 2:1; Di-cyclohexyl amine: DMTD, in ratios of 1:1 and 2:1; Aniline: DMTD, in ratios of 1:1 and 2:1: similar salts of TMT, as for example Di-cyclohexyl amine: TMT, in a ratio of 1:1. Additional examples include poly-ammonium salts of DMTD or (DMTD)$_n$ and TMT formed with polyamines.

Additional examples include inherently conductive polyaniline doped with DMTD or (DMTD)$_2$ or 5,5' thio-bis (1,3,4 thiadiazole-2(3H)-thione and TMT; Inherently conductive polypyrrole and/or polythiophene doped with DMTD, (DMTD)$_2$ and 5,5' thio-bis (1,3,4 thiadiazole-2(3H)-thione and/or TMT.

Additional examples include micro or nano composites of poly DMTD/polyaniline, poly DMTD/polypyrrole, and poly DMTD/polythiophene; similar micro or nano composites with TMT; and with 5,5' thio-bis (1,3,4 thiadiazole-2(3H)-thione; DMTD or salts of DMTD or derivatives of DMTD and of TMT, as organic constituents of various pigment grade inorganic matrixes or physical mixtures. In some aspects, such inorganic matrixes include non-toxic anionic and cationic species with corrosion inhibitor properties, such as: MoO$_4^-$, PO$_4^-$, HPO$_3^-$, poly-phosphates, BO$_2^-$, SiO$_4^-$, NCN$^-$, WO$_4^-$, phosphomolybdate, phosphotungstate and respectively, Mg, Ca, Sr, La, Ce, Zn, Fe, Al, Bi.

Additional examples include DMTD or salts of DMTD or derivatives of DMTD and TMT in encapsulated forms, such as: inclusions in various polymer matrices, or as cyclodextrin-inclusion compounds or in microencapsulated form.

Pigment grade forms of DMTD include Zn(DMTD)$_2$ and Zn-DMTD (among other organic and inorganic salts of the former) with inorganic products or corrosion inhibitor pigments, such as: phosphates, molybdates, borates, silicates, tungstates, phosphotungstates, phosphomolybdates, cyanamides or carbonates of the previously specified cationic species, as well as oxides. Examples include: zinc phosphate, cerium molybdate, calcium silicate, strontium borate, zinc cyanamide, cerium phosphotungstate, ZnO, CeO$_2$, ZrO$_2$, and amorphous SiO$_2$.

In at least one aspect, a corrosion inhibitor is a lithium ion, and a counter ion, which may include various ions known to form salts with lithium. Non-limiting examples of counter ions suitable for forming a salt with lithium include carbonates, hydroxides and silicates (e.g., orthosilicates and metasilicates). In at least one aspect, for example, the corrosion inhibitor includes a lithium carbonate salt, a lithium hydroxide salt, or a lithium silicate salt (e.g., a lithium orthosilicate salt or a lithium metasilicate salt). Additionally, in at least one aspect, the counter ion includes various ions known to form salts with the other Group IA (or Group 1) metals (e.g., Na, K, Rb, Cs and/or Fr). Nonlimiting examples of counter ions suitable for forming a salt with the alkali metals include carbonates, hydroxides and silicates (e.g., orthosilicates and metasilicates). In at least one aspect, for example, the corrosion inhibitor includes an alkali metal carbonate salt, an alkali metal hydroxide salt, and/or an alkali metal silicate salt (e.g. an alkali metal orthosilicate salt or an alkali metal metasilicate salt). For example, some nonlimiting examples of suitable salts include carbonates, hydroxides and silicates (e.g., orthosilicates or metasilicates) of sodium, potassium, rubidium, cesium, and francium.

Corrosion inhibitors of the present disclosure include aluminum and magnesium rich compounds, which can provide cathodic protection of a material. Corrosion inhibitors of the present disclosure can include Cesium compounds.

Acid stabilizer: An acid stabilizer used to form sol-gels of the present disclosure provides stabilization of a metal alkoxide and a corrosion inhibitor (if present) of the sol-gel as well as pH reduction of the sol-gel. The pH value of the sol-gel (and composition that forms the sol-gel) can be controlled by use of an acid stabilizer. Acid stabilizers of the present disclosure include organic acids. Organic acids include acetic acid (such as glacial acetic acid) or citric acid. Less acidic acid stabilizers (e.g., pKa greater than that of acetic acid) may also be used, such as glycols, ethoxyethanol, or $H_2NCH_2CH_2OH$.

In at least one aspect, a pH of a sol-gel of the present disclosure is from about 2 to about 5, such as about 3 to about 4. In at least one aspect, a weight fraction (wt %) of acid stabilizer in the sol-gel is from about 0.1 wt % to about 10 wt %, such as from about 0.2 wt % to about 5 wt %, such as from about 0.3 wt % to about 3 wt %, such as from about 0.4 wt % to about 2 wt %, such as from about 0.5 wt % to about 1 wt %, for example about 0.1 wt %, about 0.2 wt %, about 0.3 wt %, about 0.4 wt %, about 0.5 wt %. In at least one aspect, a wt % of acid stabilizer in a sol-gel is about 0.5 wt % and a weight fraction of metal alkoxide is about 0.6 wt % or greater. In another aspect, a wt % of acid stabilizer in a sol-gel is about 0.3 wt % and a weight fraction of metal alkoxide is less than 0.6 wt %. Preferably, a ratio of metal alkoxide to acid stabilizer in a sol-gel is from about 1:1 to about 3:1, such as about 2:1.

If a corrosion inhibitor is present in a sol-gel, a molar ratio of acid stabilizer to metal alkoxide can be from about 1:1 to about 40:1, such as from about 3:1 to about 8:1, such as from about 4:1 to about 6:1, such as from about 4:1 to about 5:1.

Without being bound by theory, it is believed that acid stabilizer in these ratios not only contributes to stabilizing a metal alkoxide for hydrolysis, but also protonates thiol moieties of a corrosion inhibitor (if present), which reduces or prevents reaction of the corrosion inhibitor with, for example, a metal alkoxide.

Solvent

One or more sol-gel components of the present disclosure may be dissolved in one or more solvents before being added to a mixture containing the other sol-gel components. Corrosion inhibitors, for example, generally have limited solubility in water and aqueous solvents. Corrosion inhibitors may be insoluble powders, insoluble materials (e.g., aggregates, solids, and/or liquids), hydrophobic compounds, heavy oils, and/or greases. Hence, sol-gel components may be dissolved in compatible solvents and may be suspended, emulsified, and/or dispersed within incompatible solutions and/or solvents. Suitable solvents for dissolving, suspending, emulsifying, and/or dispersing sol-gel components of the present disclosure are polar organic and/or non-polar organic.

Polar organic solvents are advantageous for dissolving sol-gel components, such as corrosion inhibitors. Additionally or alternatively, sol-gel components can be suspended, emulsified, and/or dispersed in a solvent. Examples of organic solvents for dissolving, suspending, emulsifying, and/or dispersing sol-gel components include at least one of alcohol (e.g., ethanol or propanol), ethylene glycol, propylene glycol, polyethylene glycol, polypropylene glycol, ether (e.g., dimethyl ether or dipropylene glycol dimethyl ether), glycol ether, tetrahydrofuran (THF), N-methyl-2-pyrrolidone (NMP), and dimethyl sulfoxide (DMSO). In at least one aspect, an organic solvent is selected from at least one of ethanol, n-propanol, isopropanol, 1-butanol, 2-butanol, 1-pentanol, 2-pentanol, 3-pentanol, 1-hexanol, 2-hexanol, and 3-hexanol. Organic solvents of the present disclosure can be anhydrous, e.g. greater than 99% purity. In at least one aspect, a sol-gel formulation has an organic solvent content of from about 50 wt % to about 99 wt % based on the total weight of the sol-gel formulation, such as from about 60 wt % to about 97 wt %, such as from about 80 wt % to about 95 wt %, such as from about 90 wt % to about 95 wt %, for example about 95 wt %, about 96 wt %, about 97 wt %, about 98 wt %, about 99 wt %. Upon curing, e.g. heating, of a mixture containing the sol-gel components, some or all of the solvent(s) can be removed from the sol-gel/mixture.

In at least one aspect, a weight percent (wt %) of (metal alkoxide+organosilane+acid stabilizer) in the mixture is from about 0.1 wt % to about 30 wt %, such as from about 0.3 wt % to about 20 wt %, such as from about 1 wt % to about 10 wt %, such as from about 1 wt % to about 5 wt %, such as from about 2 wt % to about 4 wt %, such as from about 2 wt % to about 3 wt %, for example about 1 wt %, about 1.5 wt %, about 2 wt %, about 2.5 wt %, about 3 wt %.

Sol-Gels

Sol-gels of the present disclosure include an organic solvent and have a water content from about 0.1 wt % to about 10 wt %, such as from about 0.1 wt % to about 10 wt %, such as from about 0.1 wt % to about 5 wt %, such as from about 0.1 wt % to about 3 wt %, such as from about 0.1 wt % to about 1 wt %, such as about 0.1 wt % to about 0.5 wt %. In at least one aspect, a sol-gel has a water content of 0.5 wt % or less, such as 0.3 wt % or less, such as 0.1 wt % or less, such as 0 wt %. It has been discovered that a sol-gel having, for example, 1 wt % or less of water forms a sol-gel with sufficient adhesion ability to substrates, such as steel substrates, in addition to maintaining or improving corrosion resistance (e.g., reduced flash rust) as compared to conventional sol-gels that contain, for example, 90 wt % water or greater.

In at least one aspect, a weight fraction (wt %) of (metal alkoxide+hydroxy organosilane+acid stabilizer) in the sol-gel is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 10 wt %, about 12 wt %, about 15 wt %. A greater amount of (metal alkoxide+hydroxy organosilane+acid stabilizer) provides greater amounts of corrosion inhibitor to be present in the sol-gel. A weight fraction (wt %) of corrosion inhibitor in the sol-gel is from about 0.1 wt % to about 50 wt %, such as from about 0.2 wt % to about 40 wt %, such as from about 0.5 wt % to about 35 wt %, such as from about 1 wt % to about 30 wt %, such as from about 2 wt % to about 25 wt %, such as from about 3 wt % to about 20 wt %, for example about 4 wt %, about 5 wt %, about 7 wt %, about 10 wt, about 15 wt %.

Sol-Gel Systems

FIG. 1 is a side view of a corrosion-inhibiting sol-gel system 100 comprising a sol-gel 102 is disposed on a material substrate 104. Sol-gel 102 has corrosion inhibiting properties which provide corrosion protection of material substrate 104. Sol-gel 102 promotes adherence between metal substrate 104 and a secondary layer 106. Secondary layer 106 can be a sealant, adhesive, primer or paint, which can be deposited onto sol-gel 102 by, for example, spray drying.

Material substrate 104 can be any suitable material and/or can include any suitable structure that benefits from sol-gel 102 being disposed thereon. Metal substrate 104 may be one or more components (such as structural or mechanical components) of environmentally exposed apparatuses, such as aircraft, watercraft, spacecraft, land vehicles, equipment, civil structures, fastening components, and/or another apparatus susceptible to environmental degradation. Material substrate 104 can be part of a larger structure, such as a vehicle component. A vehicle component is any suitable component of a vehicle, such as a structural component, such as landing gears, a panel, or joint, of an aircraft, etc. Examples of a vehicle component include a rotor blade, landing gears, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. Material substrate 104 can be made of at least one of aluminum, aluminum alloy, magnesium, magnesium alloy, nickel, iron, iron alloy, steel, titanium, titanium alloy, copper, and copper alloy, as well as glass/silica and other inorganic or mineral substrates. In at least one aspect, material substrate 104 is made of steel. Material substrate 104 can be a 'bare' substrate, having no plating (unplated metal), conversion coating, and/or corrosion protection between material substrate 104 and sol-gel 102. Additionally or alternatively, material substrate 104 can include surface oxidization and/or hydroxylation. Hence, sol-gel 102 can be directly bonded to material substrate 104 and/or to a surface oxide layer on a surface of material substrate 104. In at least one aspect, the material is not water sensitive, but a sol-gel disposed on the material is capable of protecting other adjacent structures that might be water sensitive.

Secondary layer 106 is disposed on a second surface 110 of sol-gel 102 opposite first surface 108 of sol-gel 102. In at least one aspect, sol-gel 102 has a thickness that is less than the thickness of material substrate 104. In at least one aspect, sol-gel 102 has a thickness of from about 1 µm (microns) to about 500 nm, such as from about 5 µm to about 100 nm, such as from about 10 µm to about 100 µm. Thinner coatings may have fewer defects (more likely to be defect free), while thicker coatings may provide more abrasion, electrical, and/or thermal protection to the underlying material substrate 104.

In at least one aspect, secondary layer 106 includes organic material (e.g., organic chemical compositions) configured to bind and/or adhere to sol-gel 102. Secondary layer 106 can be a paint, a topcoat, a polymeric coating (e.g., an epoxy coating, and/or a urethane coating), a polymeric material, a composite material (e.g., a filled composite and/or a fiber-reinforced composite), a laminated material, or mixtures thereof. In at least one aspect, secondary layer 106 includes at least one of a polymer, a resin, a thermoset polymer, a thermoplastic polymer, an epoxy, a lacquer, a polyurethane, and a polyester. Secondary layer 106 can additionally include at least one of a pigment, a binder, a surfactant, a diluent, a solvent, a particulate (e.g., mineral fillers), corrosion inhibitors, and fibers (e.g., carbon, aramid, and/or glass fibers).

Figure 2:
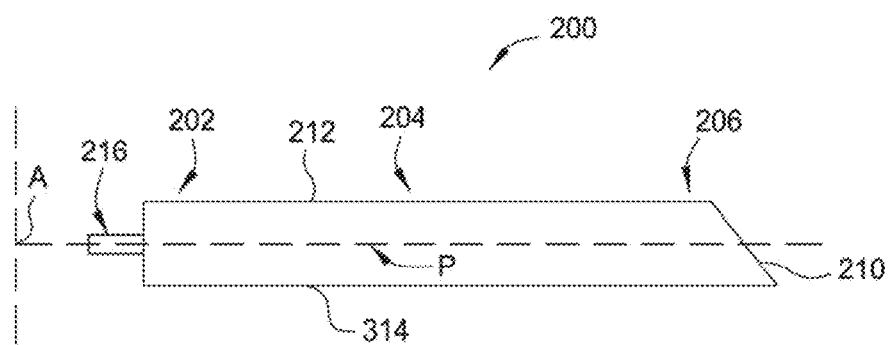
FIG. 2 is a perspective view of a rotor blade, according to at least one aspect of the present disclosure.

In at least one aspect, material layer 104 is a pitch horn of a rotor blade. Rotor blades of the present disclosure comprise one or more rotor blade components. As described herein, "rotor blade component" comprises any suitable structure adapted, in combination with one or more other rotor blade components, to form a rotor blade. FIG. 2 is a perspective view of a rotor blade, according to some aspects of the present disclosure. As shown in FIG. 2, rotor blade 200 of a main rotor assembly (not shown) is made of a root section 202, an intermediate section 204, and a tip section 206. Root section 202 is coupled with pitch horn 216. Each of sections 202, 204, 206 is any suitable geometry to tailor rotor blade aerodynamics to the velocity increase along the rotor blade span. Rotor blade tip section 206 comprises an angled geometry such as anhedral, cathedral, gull, and bent, among others. Rotor blade sections 202, 204, 206 define a span of rotor blade 200 between the axis of rotation A and a distal end 210 of tip section 206 along a longitudinal axis P between a first edge 212 and a second edge 214.

Methods of Forming Sol-Gel

Methods of forming a sol-gel of the present disclosure include mixing a metal alkoxide, acetic acid, and an organic solvent, such as an anhydrous organic solvent, followed by stirring for from about 1 minute to about 1 hour, such as about 30 minutes. Additional organic solvent (e.g., from about 1 vol % to 20 vol % of total volume, such as 5 vol %) is then added to the metal alkoxide/acetic acid mixture. An organosilane is then added to the mixture and stirred for from about 1 minute to about 1 hour, such as about 30 minutes. Optionally, a corrosion inhibitor is added to the mixture. The mixture can be deposited onto a material substrate. The deposited mixture may be cured at ambient temperature or can be heated to increase the rate of curing/sol-gel formation.

Figure 3:
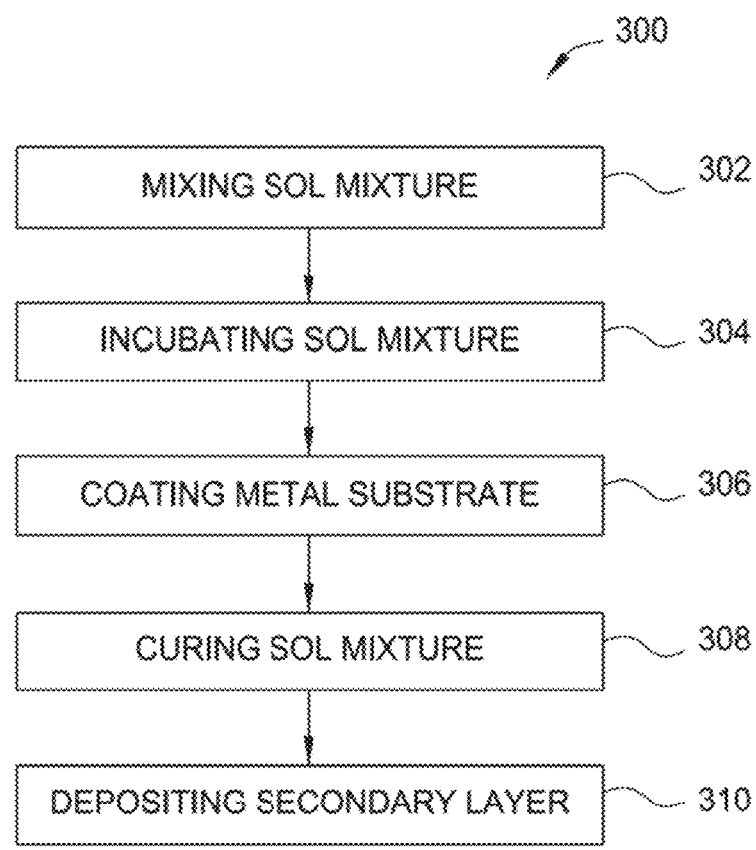
FIG. 3 is a flow chart of a method of forming a sol-gel, according to at least one aspect of the present disclosure.

FIG. 3 is a flow chart illustrating a method 300 of forming a sol-gel 102. At block 302, sol-gel 102 can be formed by mixing one or more sol-gel components. Sol-gel components include two or more of organosilane, metal alkoxide, acid stabilizer, and optionally a corrosion inhibitor. At block 308, curing the mixed components forms sol-gel 102.

Generally, mixing 302 is performed by combining the sol-gel formulation components (e.g., dispersing, emulsifying, suspending, and/or dissolving) in an organic solvent, preferably an anhydrous organic solvent, and optionally stirring the sol-gel formulation.

Mixing 302 includes mixing the sol-gel components to form a mixture (e.g., a solution, a mixture, an emulsion, a suspension, and/or a colloid). In at least one aspect, mixing 302 includes mixing all sol-gel components together concurrently. Alternatively, mixing 302 includes mixing any two components (e.g., metal alkoxide and acid stabilizer in an organic solvent) to form a first mixture and then mixing the remaining components into the first mixture to form a second mixture. The first mixture and second mixture each have a water content from about 0.1 wt % to about 10 wt %, such as from about 0.1 wt % to about 5 wt %, such as from about 0.1 wt % to about 3 wt %, such as from about 0.1 wt % to about 1 wt %, such as about 0.1 wt % to about 0.5 wt %, such as 0.5 wt % or less, such as 0.3 wt % or less, such as 0.1 wt % or less, such as 0 wt %.

Mixing 302 can include dissolving, suspending, emulsifying, and/or dispersing the sol-gel components in an organic solvent before mixing with one or more of the other sol-gel components. Examples of solvents for dissolving, suspending, emulsifying, and/or dispersing sol-gel components include one or more of alcohol (e.g., ethanol or propanol), ethylene glycol, propylene glycol, polyethylene glycol, polypropylene glycol, ether (e.g., dimethyl ether or dipropylene glycol dimethyl ether), glycol ether, tetrahydrofuran (THF), N-methyl-2-pyrrolidone (NMP), and dimethyl sulfoxide (DMSO). In at least one aspect, an organic solvent is one or more of ethanol, n-propanol, isopropanol, 1-butanol, 2-butanol, 1-pentanol, 2-pentanol, 3-pentanol, 1-hexanol, 2-hexanol, and 3-hexanol. Organic solvents of the present disclosure can be anhydrous, e.g. greater than 99% purity. In at least one aspect, a sol-gel formulation has an organic solvent content of from about 50 wt % to about 99 wt % based on the total weight of the sol-gel formulation, such as from about 60 wt % to about 97 wt %, such as from about 80 wt % to about 95 wt %, such as from about 90 wt % to about 95 wt %, for example about 95 wt %, about 96 wt %, about 97 wt %, about 98 wt %, about 99 wt %.

Additionally or alternatively, mixing 302 can include mixing one or more of the sol-gel components as a solid, an aggregate, and/or a powder with one or more of the other sol-gel components. Where, for example, mixing 302 includes mixing solids, powders, and/or viscous liquids, mixing 302 can include mixing with a high-shear mixer (e.g., a paint shaker or a planetary-centrifugal mixer or stirrer). A high-shear mixer can be advantageous to break and/or to finely disperse solids to form a substantially uniform mixture. For example, a high-shear mixer can dissolve, suspend, emulsify, disperse, homogenize, deagglomerate, and/or disintegrate solids into the sol-gel formulation.

The sol-gel components during mixing 302 can be diluted to control self-condensation reactions and thus increase the pot life of the mixed sol-gel formulation. Mixing 302 can include mixing and a weight percent (wt %) of (metal alkoxide+organosilane+acid stabilizer) in the mixture is from about 0.1 wt % to about 30 wt %, such as from about 0.3 wt % to about 20 wt %, such as from about 1 wt % to about 10 wt %, such as from about 1 wt % to about 5 wt %, such as from about 2 wt % to about 4 wt %, such as from about 2 wt % to about 3 wt %, for example about 1 wt %, about 1.5 wt %, about 2 wt %, about 2.5 wt %, about 3 wt %.

Mixing 302 can include mixing and a weight percent (wt %) of the corrosion inhibitor in the mixture is from about 0.1 wt % to about 50 wt %, such as from about 0.2 wt % to about 40 wt %, such as from about 0.5 wt % to about 35 wt %, such as from about 1 wt % to about 30 wt %, such as from about 2 wt % to about 25 wt %, such as from about 3 wt % to about 20 wt %, for example about 4 wt %, about 5 wt %, about 7 wt %, about 10 wt, about 15 wt %. In at least one aspect, a sol-gel formulation contains a corrosion inhibitor and mixing 302 includes mixing and a weight percent (wt %) of (metal alkoxide+organosilane+acid stabilizer) in the mixture is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 10 wt %, about 12 wt %, about 15 wt %.

In at least one aspect, a molar ratio of acid stabilizer to metal alkoxide in a sol-gel formulation during mixing 302 is from about 1:1 to about 40:1, such as from about 3:1 to about 8:1, such as from about 4:1 to about 6:1, for example about 2:1.

A mixture of sol-gel components can be incubated 304 for a period of time, such as from about 1 minute to about 60 minutes, such as from about 5 minutes to about 30 minutes, such as from about 10 minutes to about 20 minutes. Furthermore, pot-life is the period of time from the mixing until the sol-gel is formed (e.g., the mixture becomes too viscous to be usable). The pot life can be from about 1 hour to about 24 hours, such as from about 2 hours to about 8 hours, such as about 4 hours. Incubating 304 may be performed under ambient conditions (e.g., at room temperature) and/or at elevated temperature. Suitable incubation temperatures include from about 10° C. to about 100° C., such as from about 20° C. to about 70° C., such as from about 30° C. to about 50° C., for example about 40° C.

In at least one aspect, method 300 includes coating (at block 306) material substrate 104 with a mixture comprising sol-gel components and incubating (at block 304) the mixture. Incubating 304 includes, after mixing the mixture comprising sol-gel components, allowing the mixture comprising sol-gel components to stand at room temp for about 30 minutes or more. Coating 306 can include wetting the material substrate 104 with a mixture comprising sol-gel components, for example, by spraying, immersing, brushing, and/or wiping the mixture comprising sol-gel components onto material substrate 104. For example, suitable forms of spraying include spraying with a spray gun, high-volume, low-pressure spray gun, and/or hand pump sprayer. The mixture comprising sol-gel components is allowed to drain from the wetted material substrate 104 for a few minutes (e.g., 1-30 minutes, 1-10 minutes, or 3-10 minutes) and, if necessary, excess, undrained mixture may be blotted off material substrate 104 and/or gently blown off material substrate 104 by compressed air.

In at least one aspect, coating 306 includes cleaning and/or pretreating material substrate 104 before wetting the material substrate with the mixture comprising sol-gel components. Generally, sol-gel 102 adheres and/or bonds better with a clean, bare material substrate, substantially free from dirt, nonreactive surface oxides, and/or corrosion products, and preferably populated with a sufficient concentration of reactive hydroxyl groups or other chemically-reactive species. Material substrate surface preparation methods can include degreasing, an alkaline wash, chemical etching, chemically deoxidizing, mechanically deoxidizing (e.g., sanding and/or abrading) and/or other suitable approaches towards creating a sol-gel compatible surface. Coating 306 does not typically include coating metal substrate 104 with an undercoating or forming a chemical conversion coating on metal substrate 104, unless the coating is applied to create a hydroxyl-rich or otherwise improved compatibility with the sol-gel. A material substrate surface can become hydroxyl-rich by depositing silica hydroxylates onto the material surface.

In at least one aspect, methods of the present disclosure include curing a mixture comprising sol-gel components. As shown in FIG. 3, curing 308 can include drying a mixture comprising sol-gel components disposed on material substrate 104 and may be performed under ambient conditions, at room temperature, and/or at elevated temperature. In at least one aspect, a curing temperature is from about 10° C. to about 150° C., such as from about 30° C. to about 100° C., such as from about 50° C. to about 90° C., for example about 60° C., about 70° C., about 80° C. Curing 308 can be performed for a period of time, such as from about 1 minute to about 48 hours, such as from about 5 minutes to about 24 hours, such as from about 10 minutes to about 8 hours, such as from about 30 minutes to about 4 hours, for example about 1 hour.

After coating 306 and/or curing 308, the sol-gel is suitable for exposure to an external environment and/or for application of a secondary layer 106. As shown in FIG. 3, at block 310, depositing a secondary layer 106 of organic material can be performed before curing 308 is completely finished, for example, depositing 310 a secondary layer 106 is performed at least partially concurrently with curing 308. Depositing 310 can include painting, spraying, immersing, contacting, adhering, and/or bonding sol-gel 102 with the organic material to form secondary layer 106. A secondary layer includes a paint, a fiber-reinforced plastic, or other suitable organic material.

Aspects Listing

Clause 1. A method of forming a sol-gel, comprising:
mixing a metal alkoxide, an acid stabilizer, and an organic solvent to form a first mixture having about 10 wt % or less water content based on the total weight of the first mixture; and
mixing with the first mixture an organosilane to form a second mixture having about 10 wt % or less water content based on the total weight of the second mixture.

Clause 2. The method of clause 1, wherein mixing to form the first mixture comprises dispersing, emulsifying, suspending, or dissolving the metal alkoxide and acid stabilizer in the organic solvent.

Clause 3. The method of clause 1 or 2, further comprising incubating the second mixture at a temperature from about 10° C. to about 100° C.

Clause 4. The method of any one of clauses 1 to 3, further comprising curing the second mixture at a temperature from about 10° C. to about 150° C.

Clause 5. The method of any one of clauses 1 to 4, further comprising depositing the first mixture or the second mixture onto a metal substrate.

Clause 6. The method of any one of clauses 1 to 5, further comprising cleaning the metal substrate by degreasing, alkaline washing, chemical etching, chemically deoxidizing, and/or mechanically deoxidizing the metal surface prior to depositing.

Clause 7. The method of any one of clauses 1 to 6, wherein the metal substrate is a vehicle component.

Clause 8. The method of clause 7, wherein the vehicle component is one or more of a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, and a wing rib-to-skin joint.

Clause 9. The method of any one of clauses 5 to 8, wherein the metal substrate is one or more of aluminum, aluminum alloy, nickel, iron, iron alloy, steel, titanium, titanium alloy, copper, and copper alloy.

Clause 10. The method of clause 9, wherein the metal substrate is steel.

Clause 11. The method of any one of clauses 1 to 10, further comprising depositing a secondary layer onto the sol-gel.

Clause 12. The method of any one of clauses 1 to 11, wherein mixing the metal alkoxide and the acid stabilizer is performed by sequentially depositing the metal alkoxide onto a metal substrate and depositing the acid stabilizer onto the metal substrate.

Clause 13. The method of any one of clauses 1 to 12, wherein the first mixture and second mixture have a water content from about 0.1 wt % to about 5 wt % based on the total weight of the first mixture and second mixture, respectively.

Clause 14. The method of any one of clauses 1 to 13, wherein the first mixture and second mixture have a water content from about 0.1 wt % to about 3 wt % based on the total weight of the first mixture and second mixture, respectively.

Clause 15. The method of any one of clauses 1 to 14, wherein the first mixture and second mixture have a water content of about 1 wt % or less based on the total weight of the first mixture and second mixture, respectively.

Clause 16. The method of any one of clauses 1 to 15, wherein the first mixture and second mixture have a water content of about 0.5 wt % or less based on the total weight of the first mixture and second mixture, respectively.

Clause 17. The method of any one of clauses 1 to 16, wherein the organic solvent is one or more of an alcohol, ethylene glycol, propylene glycol, polyethylene glycol, polypropylene glycol, an ether, tetrahydrofuran, N-methyl-2-pyrrolidone, and dimethyl sulfoxide.

Clause 18. The method of any one of clauses 1 to 17, wherein the organic solvent is an alcohol that is ethanol, n-propanol, isopropanol, 1-butanol, 2-butanol, 1-pentanol, 2-pentanol, 3-pentanol, 1-hexanol, 2-hexanol, or 3-hexanol.

Clause 19. The method of any one of clauses 1 to 18, wherein the organic solvent is anhydrous.

Clause 20. The method of any one of clauses 1 to 19, wherein the first mixture and second mixture have an organic solvent content of from about 50 wt % to about 99 wt % based on the total weight of the first mixture and second mixture, respectively.

Clause 21. The method of any one of clauses 1 to 20, wherein the first mixture and second mixture have an organic solvent content of from about 90 wt % to about 95 wt % based on the total weight of the first mixture and second mixture, respectively.

Clause 22. The method of any one of clauses 1 to 21, wherein the organosilane is one or more of 3-aminopropyltriethoxysilane, 3-glycidoxy-propyltriethoxysilane, p-aminophenyltrimethoxysilane, p-aminophenyltriethoxysilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane, bis[3-(triethoxysilyl)propyl] disulfide, bis[3-(trimethoxysilyl)propyl] disulfide, bis[3-(triethoxysilyl)propyl] trisulfide, bis[3-(trimethoxysilyl)propyl] trisulfide, bis[3-(triethoxysilyl)propyl] tetrasulfide, or bis[3-(trimethoxysilyl)propyl] tetrasulfide.

Clause 23. The method of any one of clauses 1 to 21, wherein the organosilane is represented by the formula:

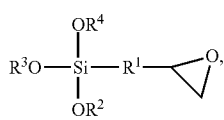

wherein each of R², R³, and R⁴ is independently linear or branched $C_{1-20}$ alkyl and R¹ is selected from alkyl, cycloalkyl, ether, and aryl.

Clause 24. The method of clause 23, wherein each of R¹, R², R³, and R⁴ is independently methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, or icosanyl.

Clause 25. The method of clause 23, wherein R¹ is an ether that is polyethylene glycol ether, polypropylene glycol ether, $C_{1-20}$ alkyl ether, aryl ether, or cycloalkyl ether.

Clause 26. The method of clause 25, wherein R is one of:

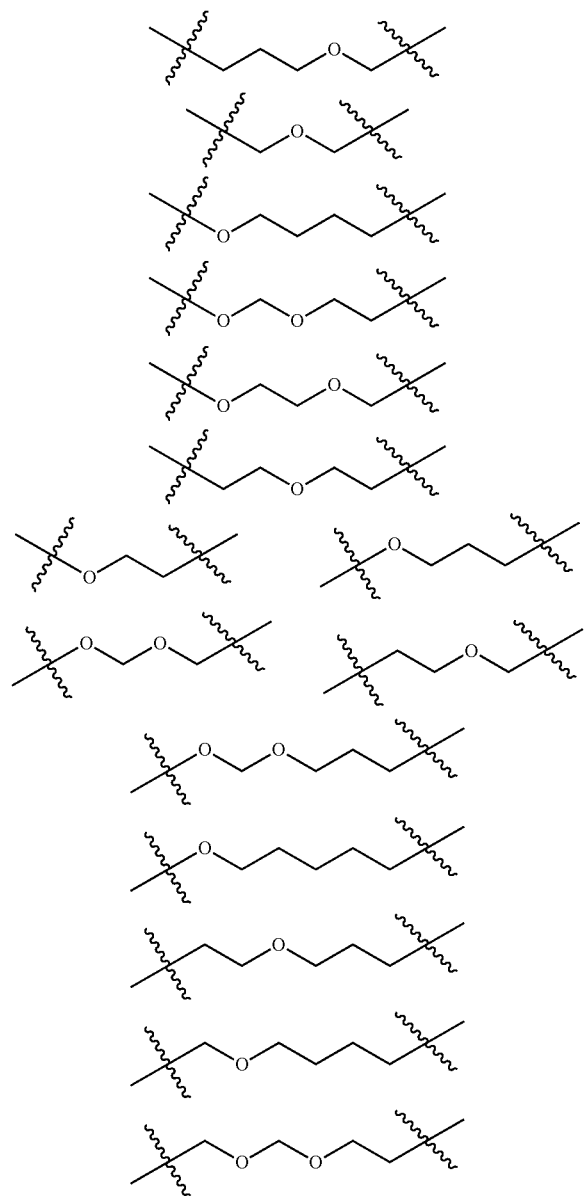
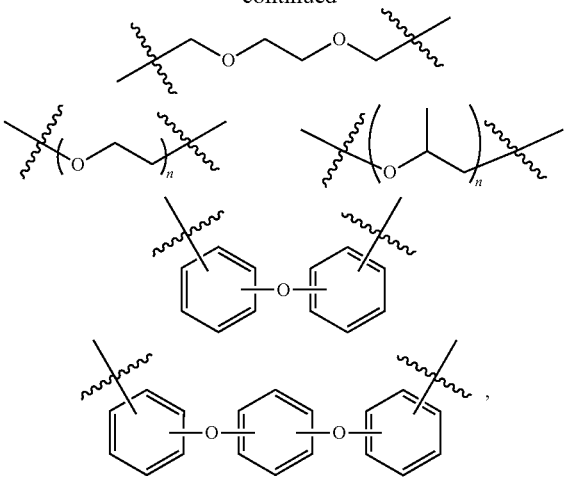

wherein n is a positive integer.

Clause 27. The method of clause 23, wherein the organosilane is

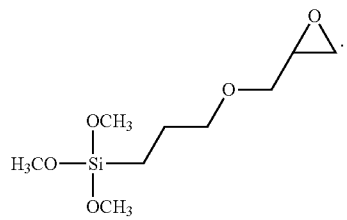 [SMILES: CO[Si](CCCOCC1CO1)(OC)OC]

Clause 28. The method of claim 1, wherein the metal alkoxide is one or more of zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide.

Clause 29. The method of any one of clauses 1 to 28, wherein the acid stabilizer is acetic acid.

EXAMPLES

Experimental: Materials: 3% AC-130-2 kit was obtained from 3M. 3% AC-131 kit was obtained from 3M. 3% AC-130-2 and 3% AC-131 are each a non-chromate conversion coating for use on aluminum, nickel, stainless steel, magnesium, and titanium alloys. The kits have a Part A, which is an aqueous mixture of acetic acid and zirconium tetra-n-propoxide (TPOZ), and a Part B, which is GTMS. The two components are mixed together (Part A+Part B) and the molar ratio of silicon to zirconium in the mixture is 2.77:1. A molar ratio of acetic acid to TPOZ in Part A is 0.45:1. As used herein, the combination of (TPOZ/GTMS/organosilane) is sometimes referred to as a "binder".

Glacial acetic acid (GAA) and glycidoxypropyl-trimethoxy-silane (GTMS) was obtained from Sigma Aldrich, UCT chemicals, Gelest, Inc., and/or Acros organics. Zirconium tetra-n-propoxide (TPOZ; 70% in n-propanol) was obtained from Sigma Aldrich or Gelest, Inc. A molar ratio of acetic acid to TPOZ is about 0.45:1.

Sol-gel formulations were disposed onto a panel, such as a pitch horn of a rotor blade. The pitch horn of the rotor blades comprises steel. All panels were grit-blasted and blown using clean filtered air before depositing a sol-gel formulation onto the panel. The sol-gel formulation was then incubated and cured.

Methods:

Sol-Gel Formulations Disposed on Fatigue Test Blade Pitch Horns

Sol-gel formulations were created and applied to fatigue blade pitch horns. The formulations possessed reduced amounts of water and acetic acid as compared to a standard 3% 3M AC-131 sol-gel formulation. After processing the pitch horn for the first fatigue blade, a small amount of orange, rust-colored tint was visible on the pitch horn and test panels. Therefore, for the second fatigue blade, the amount of glacial acetic acid and the metal alkoxide were reduced to 10% of the amounts of those present in the standard 3% AC-131 formulation. Table 1 illustrates the weight content of water, GTMS, TPOZ, and GAA, with remainder balance being reagent grade isopropyl alcohol.

TABLE 1

| Pitch horn | Water wt % | GTMS wt % | TPOZ wt % | GAA wt % |
|---|---|---|---|---|
| Test blade #1 | 5.0 | 2.0 | 0.5 | 0.25 |
| Test blade #2 | 5.0 | 2.0 | 0.1 | 0.05 |

Figure 4A:
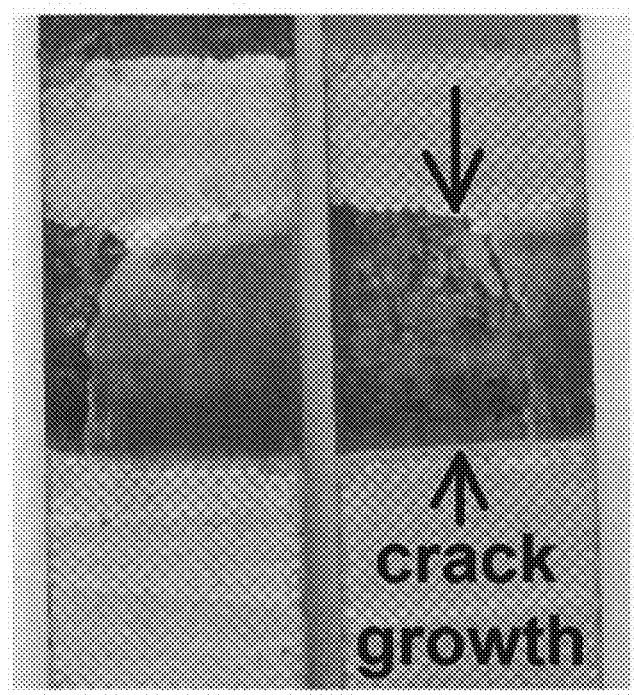
FIG. 4A is an image illustrating bondline crack growth of a non-treated alloy steel test specimen, according to at least one aspect of the present disclosure.
Figure 4B:
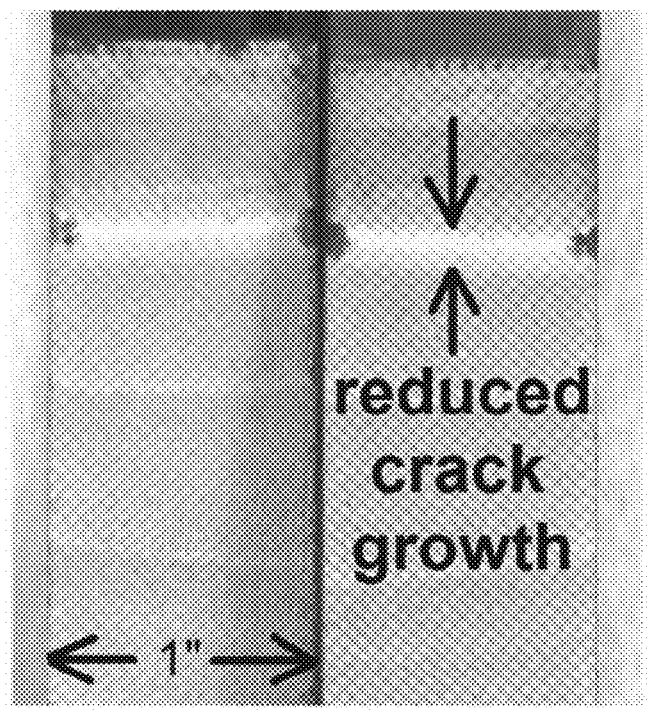
FIG. 4B is an image illustrating bondline crack growth of a test specimen treated with a 5% water version of the invention, according to at least one aspect of the present disclosure.
Figure 5:
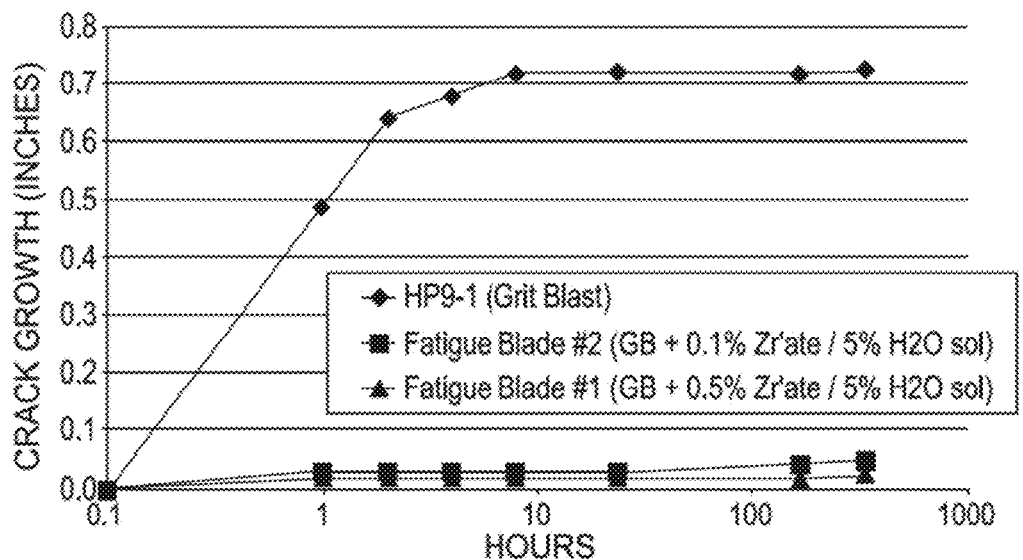
FIG. 5 is a graph illustrating crack growth test results comparing process control test specimens representing test blades having a sol-gel disposed thereon to a grit blasted test blade having no sol-gel disposed thereon, according to at least one aspect of the present disclosure.

FIGS. 4A and 4B are images illustrating bondline crack growth of low alloy steel, process control test specimens, comparing a no sol-gel treated specimen (FIG. 4A) with a 5% water version of the specimen (FIG. 4B), where the latter was used to prepare Test Blade #2 for adhesive bonding. The examples shown in FIGS. 4A and 4B were exposed at 140° F. and 85-100% relative humidity during the crack growth test, and then were separated to reveal the extent of bond failure and crack growth. Panels having the cured 5 wt % water sol-gel disposed thereon exhibited significant reductions in crack growth and corrosion as compared to panels that were not treated with the formulation disposed thereon. Nonetheless, it was observed that panels having the cured 5 wt % water sol-gel disposed thereon exhibited some 'flash rust' on the steel substrate material after treatment with the sol-gel and prior to bonding FIG. 5 is a graph illustrating crack growth test results (according to ASTM D3762) comparing test coupons representing the sol-gel treatments of Table 1, as used on Test Blade #1 and Test Blade #2, with a grit blasted-only test coupon having no sol-gel disposed thereon (labeled HP9-1 grit blast). As shown in FIG. 5, the sol-gel containing examples have much less stress crack growth as compared to an untreated HP9-1 grit blast sample, even though some 'flash rust' is observed on the sol-gel containing examples. The presence of "flash rust," even with the low (e.g., 5%) water formulation, was one reason even lower water content formulations, including 0% water formulations, were tested.

Sol-Gel Formulations Having Lower Water Content

The floating roller peel (FRP) test possesses several characteristics that are particularly advantageous for evaluating surface preparations for adhesive bonding. Results for FRP tests are shown as pounds per inch of width ("piw"). Adhesive bond failures typically initiate at localized, stress concentration regions in the bondline. The FRP test imparts a high stress-concentration load upon the bondline throughout the duration of the test, and therefore, possesses capability for detecting susceptibility of the bond when exposed to high stress concentrations. Considering that moisture resistance is a desired characteristic to be achieved using the sol-gel approach, the FRP test can also be modified to expose the bondline to moisture during the test. In each of the experimental runs described here, three different FRP specimens were tested. One test was performed under standard, room temperature, dry (RTD) conditions to provide a reference RTD test value. A second, room temperature wet (RTW) test was performed using a constant, room temperature, deionized water squirt on the peeling bondline throughout the duration of the test. The third specimen was also tested using the water-squirt technique; however, to provide more evidence with respect to moisture resistance, this specimen was first soaked in 160° F. water for one week, followed by a short room temperature water soak to allow the specimen to equilibrate at ambient temperature, and then tested using the RTW water-squirt peel test.

Table 2 illustrates sol-gel formulations of the present disclosure and floating roller peel test results of sol gels formed from the sol-gel formulations. As illustrated in Table 2, sol-gel formulations having 0 wt % water can form sol-gels disposed onto steel substrates with excellent FRP properties and had no cloudiness, which indicates that $Zr(OH)_2$ has not formed in the sol-gel formulation. Precipitation and cloudiness in the sol-gel formulation will reduce a sol-gel's ability to bond to a metal surface. Interestingly, cloudiness and precipitation increased as water content was reduced from 5 or 6 wt % water content, but cloudiness and precipitation began to decrease as water content fell below 1 wt %, for example 0 wt %.

TABLE 2

| | | | | | | | 0.010" 301SS FRP tests | | |
|---|---|---|---|---|---|---|---|---|---|
| Example | % $H_2O$ | % GTMS | % TPOZ | % GAA | % {GTMS + TPOZ} | relative clearness ranking [−2, +2] | RTD peel (piw) | RTW squirt only (piw) | RTW soak & squirt (piw) |
| 1 | 3.00 | 3.00 | 0.00 | 0.00 | 3.00 | +2 | 47.3 | 21.7 | 10.1 |
| 1a | 3.00 | 3.00 | 0.00 | 0.00 | 3.00 | +2 | 53.6 | 12.1 | 5.1 |
| 2 | 2.99 | 2.44 | 0.55 | 0.27 | 2.99 | −½ | 47.7 | 7.6 | 4.0 |
| 2a | 2.98 | 1.89 | 1.09 | 0.55 | 2.98 | −½ | 49.6 | 44.7 | 35.1 |
| 3 | 3.00 | 1.90 | 1.10 | 0.55 | 3.00 | −1 | 28.3 | 8.3 | 2.1 |
| 3a | 3.00 | 1.90 | 1.10 | 0.55 | 3.00 | −2 | 47.0 | 23.5 | 6.2 |
| 4 | 0.00 | 2.46 | 0.55 | 0.28 | 3.01 | +2 | 50.2 | 46.6 | 28.2 |
| 5 | 1.00 | 2.00 | 1.00 | 0.50 | 3.00 | −1½ | 45.1 | 41.8 | 5.0 |

TABLE 2-continued

| | | | | | | 0.010" 301SS FRP tests | | |
|---|---|---|---|---|---|---|---|---|
| Example | % H₂O | % GTMS | % TPOZ | % GAA | % {GTMS + TPOZ} | relative clearness ranking [−2, +2] | RTD peel (piw) | RTW squirt only (piw) | RTW soak & squirt (piw) |
| 5a | 1.00 | 2.00 | 1.00 | 0.50 | 3.00 | −1 | 44.4 | 44.2 | 37.9 |
| 6 | 2.99 | 2.44 | 0.55 | 0.27 | 2.99 | −1 | 43.2 | 36.6 | 3.7 |
| 7 | 1.00 | 2.90 | 0.10 | 0.05 | 3.00 | +1 | 56.8 | 49.5 | 4.7 |
| 8 | 5.00 | 2.90 | 0.10 | 0.05 | 3.00 | +2 | 51.5 | 14.1 | 3.8 |
| 9a | 6.01 | 2.46 | 0.55 | 0.28 | 3.01 | +2 | 46.5 | 45.3 | 25.9 |
| 11a | 5.00 | 2.00 | 1.00 | 0.50 | 3.00 | 0 | 48.6 | 45.1 | 11.8 |
| 12 | 5.99 | 2.80 | 0.20 | 0.10 | 3.00 | +2 | 48.5 | 47.4 | 16.8 |
| 13 | 3.99 | 2.49 | 0.50 | 0.25 | 2.99 | +½ | 47.1 | 14.0 | 6.4 |
| 14 | 4.99 | 2.65 | 0.35 | 0.17 | 2.99 | +1 | 45.3 | 43.3 | 11.0 |
| 15 | 4.00 | 2.80 | 0.20 | 0.10 | 3.00 | +1 | 48.1 | 8.8 | 18.1 |
| 16 | 5.99 | 2.49 | 0.50 | 0.25 | 2.99 | +1 | 48.4 | 41.0 | 26.7 |

| Ranking | Sol-gel Formulation Appearance | Preferred? |
|---|---|---|
| +2 | completely transparent; all sol-gel formulation components clearly in solution | yes |
| +1 | transparent/translucent; slightly cloudy; no significant precipitation | yes |
| 0 | translucent/cloudy; possibly with small amount of precipitation | borderline |
| −1 | translucent/cloudy with noticeable precipitation | no |
| −2 | Sol-gel formulation is opaque with significant precipitation | no |

With the 0 wt % water son-gel formulation in mind, additional so-gel formulations (shown in Table 3) were tested with varying amounts of metal alkoxide and glacial acetic acid. As shown in Table 3, the amounts of TPOZ and GAA can be varied in sol-gel formulations containing 0 wt % water and, after curing, the sol-gels formed have excellent FRP properties. These data indicate that sol-gel formulations of the present disclosure provide improved moisture exposure capability, corrosion resistance, and better adhesive bond properties, even when the moisture exposure occurs at the bondline with a metal, as compared to conventional sol-gel compositions having greater water content.

TABLE 3

| | | | | FRP tests | | |
|---|---|---|---|---|---|---|
| No-Water Sol-gel Formulations | Percentages | | | RTD peel (piw) | RTW squirt only (piw) | RTW soak & squirt (piw) |
| | Wt % GTMS | Wt % TPOZ | Wt % GAA | | | |
| No TPOZ; 0.25% GAA | 2 | -0- | 0.25 | 37.0 | 36.0 | 35.2 |
| No TPOZ; No GAA | 2 | -0- | -0- | 36.9 | 35.9 | 26.9 |
| 0.2% TPOZ; 0.1% GAA | 2 | 0.2 | 0.1 | 35.4 | 33.7 | 32.9 |
| 0.4% TPOZ; 0.2% GAA | 2 | 0.4 | 0.2 | 36.0 | 35.1 | 33.9 |
| 0.6% TPOZ; 0.3% GAA | 2 | 0.6 | 0.3 | 36.6 | 36.3 | 35.3 |
| 1.0% TPOZ; 0.5% GAA | 2 | 1.0 | 0.5 | 36.6 | 33.9 | 33.5 |

Figure 6:
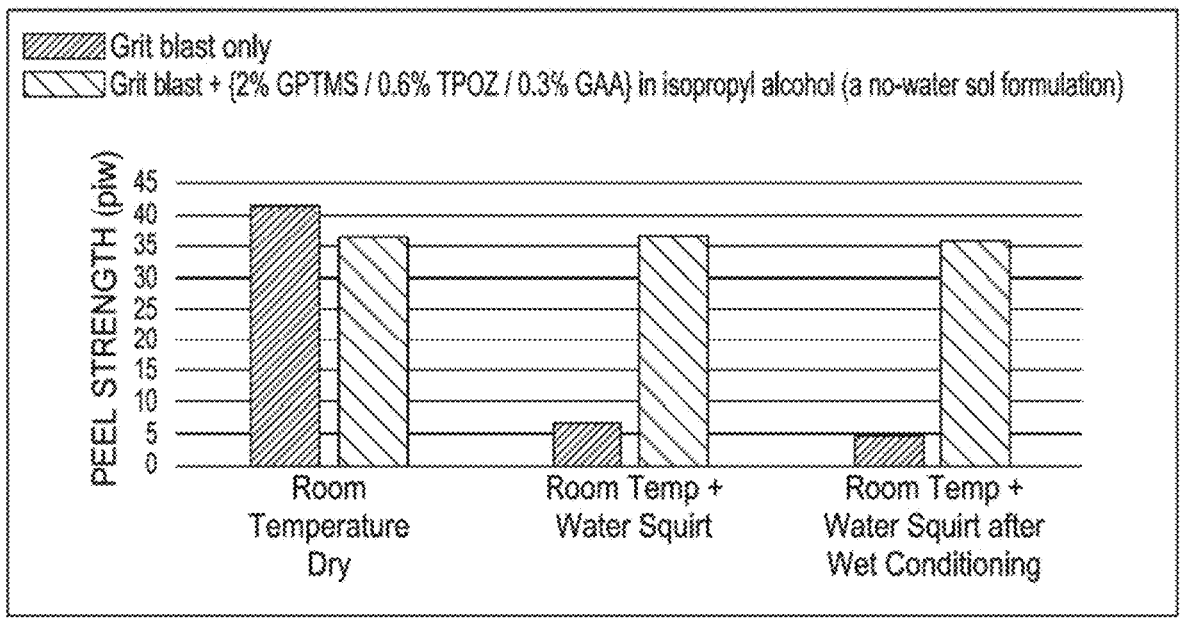
FIG. 6 is a graph illustrating dry and water-exposed floating roller peel test results representing and comparing pitch horns having 0 wt % water sol-gel formulations disposed thereon to a grit blasted test blade having no sol-gel disposed thereon, according to at least one aspect of the present disclosure.

FIG. 6 is a graph illustrating floating roller peel (FRP) test results comparing pitch horns having 0 wt % water sol-gel formulations disposed thereon to a grit blasted test blade having no sol-gel disposed thereon (labeled HP9-1 grit blast). The floating roller peel test (ASTM D3167) was performed at the following test conditions:

1) Room temperature dry conditions,
2) Room temperature with a water squirt on the peeling bondline during the test, and
3) Pre-test wet conditioning (1 week immersion in 160° F. water) followed by room temperature/water squirt testing.

As FIG. 6 illustrates, pitch horns having sol-gels formed from 0 wt % water sol-gel formulations disposed thereon have higher peel strength and are capable of retaining bond strength when exposed to moisture as compared to the grit-blast abrasion approach (HP9-1 grit blast). These data show that sol-gel compositions of the present disclosure provide improved moisture exposure capability, corrosion resistance, and better adhesive bond properties, even when the moisture exposure occurs at the bondline with a metal, as compared to conventional sol-gel compositions having greater water content.

Figure 7A:
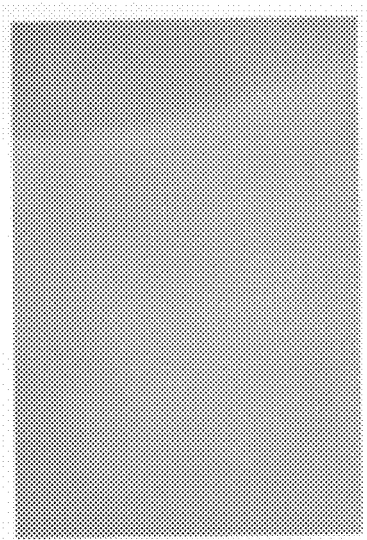
FIG. 7A is an image of a grit blasted 4130 low alloy steel panel, according to at least one aspect of the present disclosure.
Figure 7C:
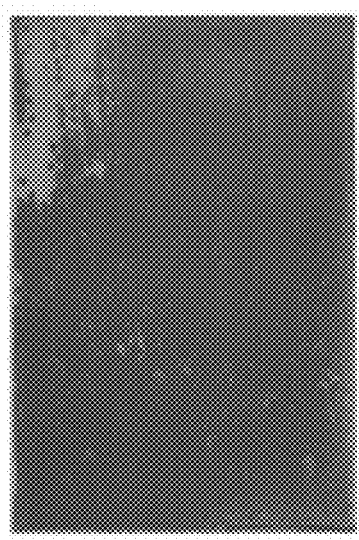
FIG. 7C is an image of a grit blasted 4130 low alloy steel panel having an aqueous sol-gel disposed thereon, according to at least one aspect of the present disclosure.
Figure 7E:
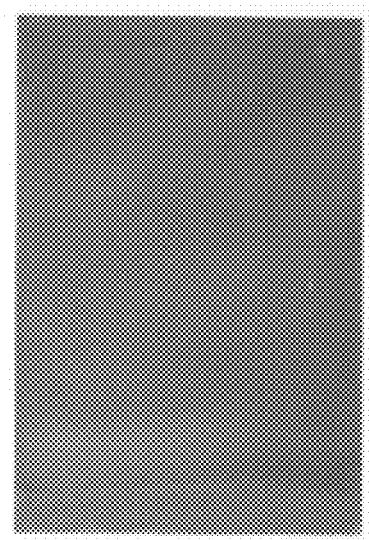
FIG. 7E is an image of a grit blasted 4130 low alloy steel panel having a nonaqueous sol-gel disposed thereon, according to at least one aspect of the present disclosure.
Figure 7B:
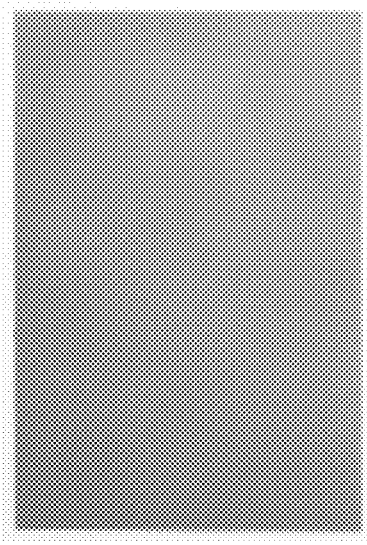
FIG. 7B is an image of a grit blasted 4130 low alloy steel panel, according to at least one aspect of the present disclosure.
Figure 7D:
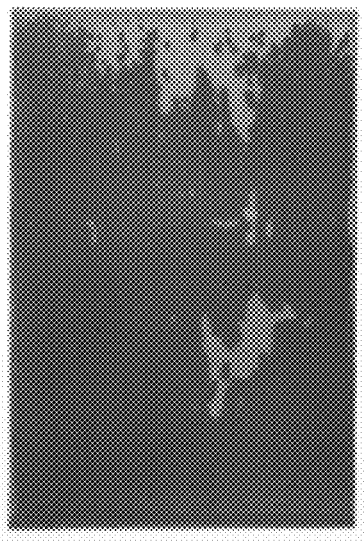
FIG. 7D is an image of a grit blasted 4130 low alloy steel panel having an aqueous sol-gel disposed thereon, according to at least one aspect of the present disclosure.
Figure 7F:
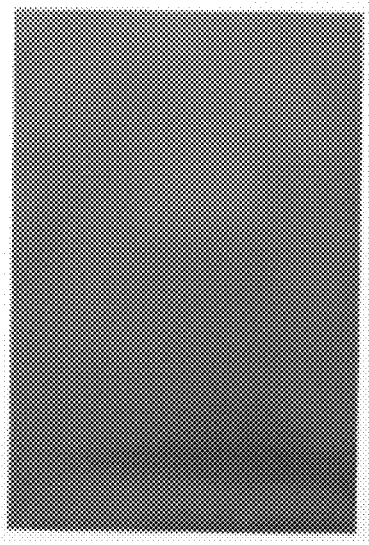
FIG. 7F is an image of a grit blasted 4130 low alloy steel panel having a nonaqueous sol-gel disposed thereon, according to at least one aspect of the present disclosure.

FIGS. 7A-7F are images comparing grit blasted 4130 low alloy steel panels, including grit-blast-only panels (left, FIGS. 7A and 7B), grit blast followed by a {1 minute drench spray+air dry} with 3M AC-130-2 sol-gel (center, FIGS. 7C and 7D), and grit blast followed by a {1 minute drench spray+air dry} with 0 wt % water sol-gel (right, FIGS. 7E and 7F), according to at least one aspect of the present disclosure. During spraying, the panels were tilted so that the aqueous sol-gel or nonaqueous sol-gel would run downwards, so the top portion of each of the aqueous sol-gel panels is a little less corroded than the bottom portion of each of the aqueous sol-gel panels. The images of FIGS. 7A-7F were taken about 1.5 hours after the air dry with no additional humidity or heat exposure to the panels. As shown in FIGS. 7C and 7D, corrosion developed on the low alloy steel when treated with the aqueous AC-130-2 treatment. 0 wt % water sol-gel prevents corrosion from occurring on the steel panels (right, FIGS. 7E and 7F).

Definitions

The term "alkyl" includes a substituted or unsubstituted, linear or branched acyclic alkyl radical containing from 1 to about 20 carbon atoms. In at least one aspect, alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, and structural isomers thereof.

The term "cycloalkyl" includes a substituted or unsubstituted, cyclic alkyl radical containing from 3 to about 20 carbon atoms.

The term "aryl" refers to any monocyclic, bicyclic or tricyclic carbon ring of up to 6 atoms in each ring, wherein at least one ring is aromatic, or an aromatic ring system of 5 to 14 carbons atoms which includes a carbocyclic aromatic group fused with a 5- or 6-membered cycloalkyl group. Examples of aryl groups include, but are not limited to, phenyl, naphthyl, anthracenyl, or pyrenyl.

The term "alkoxy" is RO— wherein R is alkyl as defined herein. The terms alkyloxy, alkoxyl, and alkoxy may be used interchangeably. Examples of alkoxy include, but are not limited to, methoxyl, ethoxyl, propoxyl, butoxyl, pentoxyl, hexyloxyl, heptyloxyl, octyloxyl, nonyloxyl, decyloxyl, and structural isomers thereof.

The term "heterocyclyl" refers to a monocyclic, bicyclic or tricyclic ring having up to 10 atoms in each ring, wherein at least one ring is aromatic and contains from 1 to 4 heteroatoms in the ring selected from N, O and S. Non-limiting examples of heterocyclyl include, but are not limited to, pyridyl, thienyl, furanyl, pyrimidyl, imidazolyl, pyranyl, pyrazolyl, thiazolyl, thiadiazolyl, isothiazolyl, oxazolyl, isoxazoyl, pyrrolyl, pyridazinyl, pyrazinyl, quinolinyl, isoquinolinyl, benzofuranyl, dibenzofuranyl, dibenzothiophenyl, benzothienyl, indolyl, benzothiazolyl, benzooxazolyl, benzimidazolyl, isoindolyl, benzotriazolyl, purinyl, thianaphthenyl and pyrazinyl. Attachment of heterocyclyl can occur via an aromatic ring or through a non-aromatic ring or a ring containing no heteroatoms.

The term "hydroxy" and "hydroxyl" each refers to —OH.

A "nonaqueous" sol-gel includes a sol-gel having 10 wt % or less water content, such as a water content from about 0.1 wt % to about 10 wt %, such as from about 0.1 wt % to about 5 wt %, such as from about 0.1 wt % to about 3 wt %, such as from about 0.1 wt % to about 1 wt %, such as about 0.1 wt % to about 0.5 wt %, such as 0.5 wt % or less, such as 0.3 wt % or less, such as 0.1 wt % or less, such as 0 wt %.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A method, comprising:
   mixing a zirconium alkoxide, an acid stabilizer, and an anhydrous organic solvent to form a first mixture;
   mixing an organosilane and a corrosion inhibitor with the first mixture to form a second mixture, the corrosion inhibitor comprising a disulfide group, a metal thiolate group, or a combination thereof, the organosilane represented by formula:

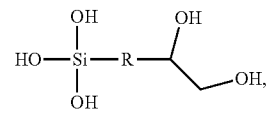

wherein R is alkyl, cycloalkyl, ether, or aryl;
   incubating the second mixture at a temperature of about 30° C. to about 50° C.;
   coating a metal substrate with the second mixture to form a coated metal substrate, the metal substrate comprising a) steel or b) an alloy comprising aluminum and an optional intermetallic; and
   curing the coated metal substrate at a temperature of about 10° C. to about 150° C. to form a sol-gel, wherein the sol-gel has a water content of 0 wt % based on a total weight of the sol-gel.

2. The method of claim 1, wherein:
   the corrosion inhibitor comprises the metal thiolate group; and
   the metal thiolate group comprises copper, zinc, zirconium, aluminum, iron, cadmium, lead, mercury, silver, platinum, palladium, gold, cobalt, or mixtures thereof.

3. The method of claim 1, wherein incubating the second mixture is performed at a temperature of about 30° C. to about 40° C.

4. The method of claim 1, further comprising cleaning the metal substrate by degreasing, alkaline washing, chemical etching, chemically deoxidizing, and/or mechanically deoxidizing a surface of said metal substrate prior to depositing.

5. The method of claim 1, wherein the metal substrate is a vehicle component selected from a group consisting of a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, and a wing rib-to-skin joint.

6. The method of claim 1, wherein the anhydrous organic solvent is selected from a group consisting of an ether, tetrahydrofuran, N-methyl-2-pyrrolidone, and dimethyl sulfoxide.

7. The method of claim 1, wherein the anhydrous organic solvent is an alcohol that is ethanol, n-propanol, isopropanol, 1-butanol, 2-butanol, 1-pentanol, 2-pentanol, 3-pentanol, 1-hexanol, 2-hexanol, or 3-hexanol.

8. The method of claim 1, wherein R is an ether, and the ether is polyethylene glycol ether, polypropylene glycol ether, $C_{1-20}$ alkyl ether, aryl ether, or cycloalkyl ether.

9. The method of claim 1, wherein R is one of:

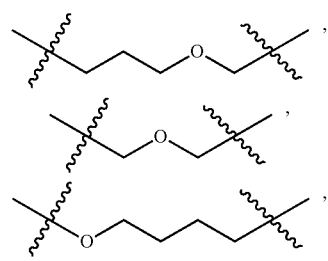

27
-continued

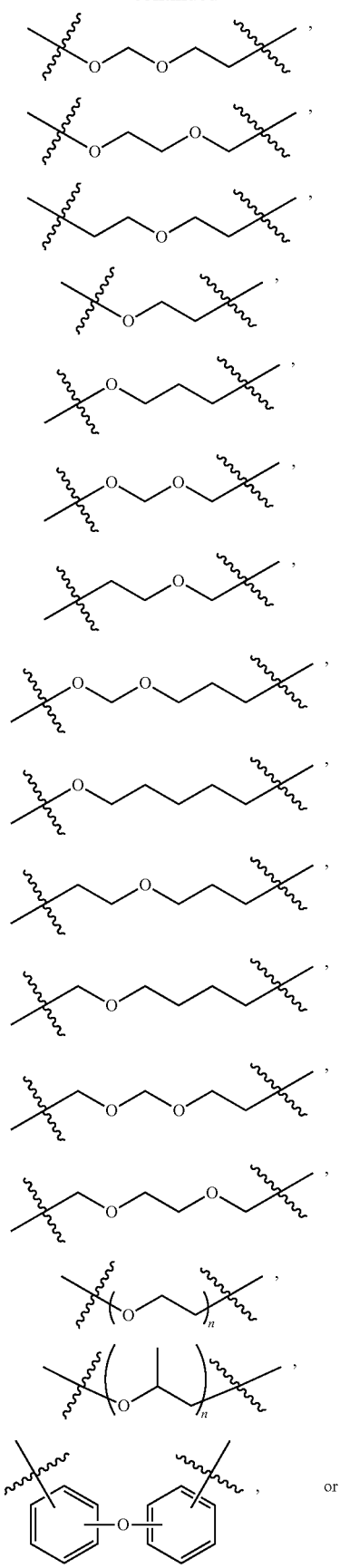

28
-continued

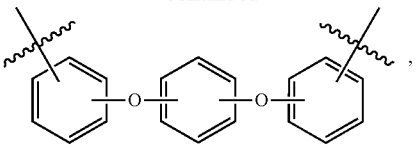

wherein n is a positive integer.

10. The method of claim 1, wherein the organosilane is:

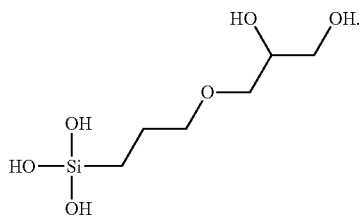 [SMILES: OCC(O)COCCC[Si](O)(O)O]

11. The method of claim 1, wherein the zirconium alkoxide is selected from a group consisting of zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide.

12. The method of claim 1, wherein the acid stabilizer is acetic acid.

13. The method of claim 1, wherein the metal substrate further comprises hydroxyl groups.

14. The method of claim 1, further comprising depositing silica hydroxylates onto the metal substrate before coating the metal substrate.

15. A method, comprising:
mixing an acid stabilizer, an anhydrous organic solvent, a corrosion inhibitor, a zirconium alkoxide, and an organosilane to form a mixture, wherein the anhydrous organic solvent is selected from the group consisting of 1-pentanol, 2-pentanol, 3-pentanol, 1-hexanol, 2-hexanol, 3-hexanol, and combinations thereof, wherein a pH of the mixture is from 2 to 5, wherein the corrosion inhibitor comprises a disulfide group, a metal thiolate group, or a combination thereof, and wherein the organosilane is represented by formula:

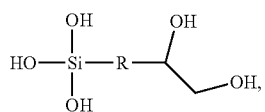

wherein R is alkyl, cycloalkyl, ether, or aryl;
incubating the mixture at a temperature of about 30° C. to about 50° C.;
coating a metal substrate with the mixture to form a coated metal substrate, the metal substrate comprising a) steel or b) an alloy comprising aluminum and an optional intermetallic; and curing the coated metal substrate at a temperature of about 10° C. to about 150° C. to form a sol-gel, wherein:
the mixture has a water content of 0 wt % based on a total weight of the mixture;
an amount of zirconium alkoxide in the mixture is from 0.2 wt % to 5 wt %, based on the total weight of the mixture;
an amount of organosilane in the mixture is from 0.7 wt % to 5 wt %, based on the total weight of the mixture; and
a ratio of the zirconium alkoxide to the acid stabilizer in the mixture is from 1:1 to 3:1.

16. The method of claim 15, wherein, when R is alkyl, R is selected from the group consisting of methyl, ethyl, propyl, butyl pentyl, hexyl, heptyl, octyl, nonyl, and decyl.

17. The method of claim 15, wherein R is aryl.

18. The method of claim 15, wherein R is

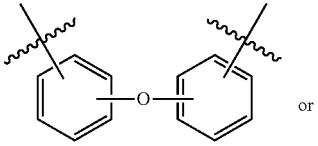 or

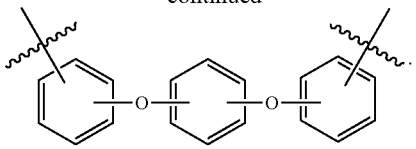.

19. The method of claim 15, wherein R is

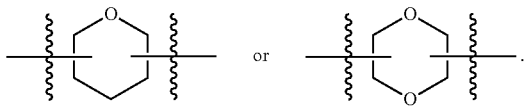.

20. The method of claim 15, wherein the metal substrate is a vehicle component selected from a group consisting of a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, and a wing rib-to-skin joint.

* * * * *

UNITED STATES PATENT AND TRADEMARK OFFICE
CERTIFICATE OF CORRECTION

PATENT NO. : 11,692,113 B2
APPLICATION NO. : 17/903331
DATED : July 4, 2023
INVENTOR(S) : James A. Moore et al.

It is certified that error appears in the above-identified patent and that said Letters Patent is hereby corrected as shown below:

In the Claims

In Column 29, Line 15, in Claim 16, delete "butyl" and insert -- butyl, --.

Signed and Sealed this
Sixteenth Day of July, 2024

Katherine Kelly Vidal
*Director of the United States Patent and Trademark Office*